(12) United States Patent
Mehrnia et al.

(10) Patent No.: US 7,693,237 B2
(45) Date of Patent: Apr. 6, 2010

(54) SYSTEMS AND METHODS FOR SYNCHRONIZING WIRELESS COMMUNICATION SYSTEMS

(75) Inventors: Alireza Mehrnia, Los Angeles, CA (US); Alireza Tarighat-Mehrabani, Los Angeles, CA (US)

(73) Assignee: WiLinx Corporation, Carlsbad, CA (US)

( * ) Notice: Subject to any disclaimer, the term of this patent is extended or adjusted under 35 U.S.C. 154(b) by 662 days.

(21) Appl. No.: 11/706,692

(22) Filed: Feb. 14, 2007

(65) Prior Publication Data

US 2008/0192863 A1 Aug. 14, 2008

(51) Int. Cl.
*H03K 9/00* (2006.01)
*H04L 27/00* (2006.01)

(52) U.S. Cl. ............... 375/316; 375/343; 455/179.1; 455/183.2

(58) Field of Classification Search ........... 375/259, 375/316, 327, 339, 343; 455/76, 450, 509, 455/179.1, 183.1, 183.2, 260, 130; 708/271, 708/313, 314, 422, 426
See application file for complete search history.

(56) References Cited

U.S. PATENT DOCUMENTS

| | | | | |
|---|---|---|---|---|
| 4,903,328 A * | 2/1990 | Ichikawa | ............... | 455/165.1 |
| 5,212,554 A * | 5/1993 | Tults | ............... | 348/735 |
| 6,006,079 A * | 12/1999 | Jaffee et al. | ............... | 455/310 |
| 6,111,910 A * | 8/2000 | Cui et al. | ............... | 375/142 |
| 6,148,044 A * | 11/2000 | Ono et al. | ............... | 375/343 |
| 6,400,752 B1 * | 6/2002 | Suzuki et al. | ............... | 375/133 |
| 6,977,976 B1 * | 12/2005 | Birkett et al. | ............... | 375/345 |
| 7,027,791 B2 * | 4/2006 | Twomey | ............... | 455/310 |
| 7,280,618 B2 * | 10/2007 | Demir et al. | ............... | 375/322 |
| 7,280,812 B2 * | 10/2007 | Demir et al. | ............... | 455/232.1 |
| 7,372,890 B2 * | 5/2008 | Batra et al. | ............... | 375/130 |
| 2005/0286619 A1 * | 12/2005 | Haddadin et al. | ............... | 375/222 |
| 2006/0066397 A1 * | 3/2006 | Dupuie | ............... | 330/133 |
| 2006/0240779 A1 * | 10/2006 | Rostami et al. | ............... | 455/63.1 |
| 2007/0054623 A1 * | 3/2007 | Sato | ............... | 455/67.11 |
| 2007/0076818 A1 * | 4/2007 | Barnes et al. | ............... | 375/316 |
| 2007/0098114 A1 * | 5/2007 | Hundhausen et al. | ............... | 375/326 |
| 2008/0020725 A1 * | 1/2008 | Demir et al. | ............... | 455/232.1 |

* cited by examiner

*Primary Examiner*—Jean B Corrielus
(74) *Attorney, Agent, or Firm*—Chad R. Walsh; Fountainhead Law Group PC

(57) ABSTRACT

In one embodiment the present invention include systems and methods for synchronizing wireless communication systems. In one embodiment, a baseband processor includes a reference frequency for synchronizing processing of received data. The baseband processor may detect received data and determine frequency hopping sequences to program a frequency synthesizer. The baseband processor may synchronize the synthesizer's frequency changes to receive incoming data. Symbols received by the system may be detected and used to start the reference frequency. In one embodiment, the reference frequency has a period equal to the symbol period. Cross-correlators may be used to detect frequency hopping patterns. Clusters of results from the cross-correlators may be analyzed and the results used to control timing of the system.

23 Claims, 15 Drawing Sheets

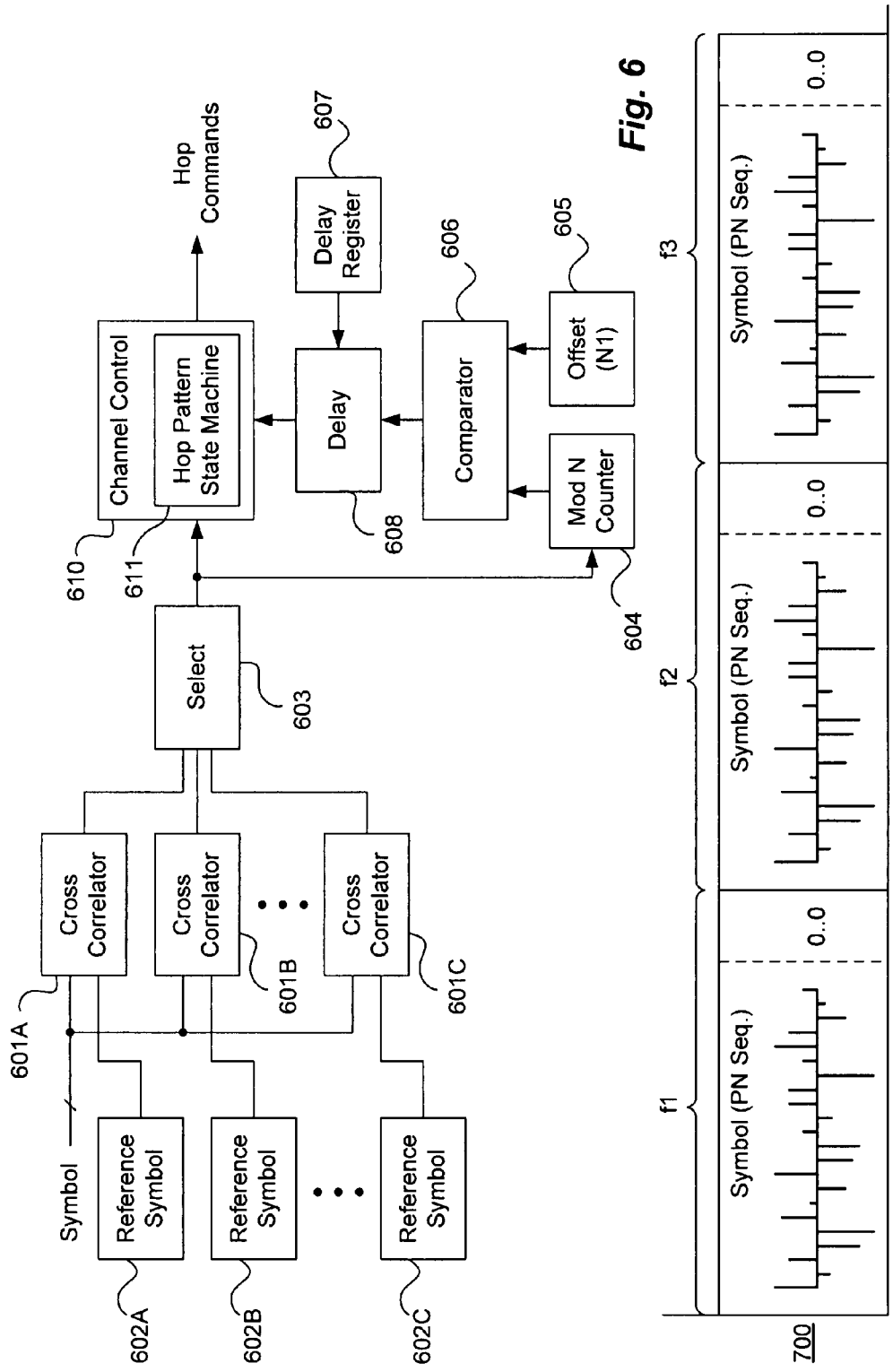

SYSTEMS AND METHODS FOR SYNCHRONIZING WIRELESS COMMUNICATION SYSTEMS

BACKGROUND

The present invention relates to wireless communication systems, and in particular, to systems and methods for synchronizing wireless communication systems.

Wireless communication systems are electronic systems that allow information to be transferred between two systems using electromagnetic waves propagating through space or air. FIG. 1A illustrates a typical wireless communication system. Wireless communication system 100 includes two wireless communication devices 101 and 102. In a typical wireless communication system, digital information is received in a first wireless device 101 and transmitted to the other wireless device 102. Similarly, digital information may be received in wireless device 102 and transmitted to wireless device 101. The transmitted digital information may then be used by other electronic devices coupled to wireless devices 101 or 102. Wireless device 101 may include a digital processing component 110, an analog processing component 120, and an antenna 121. During transmission, digital information may be received by the digital processing component 110 (e.g., from an electronic device such as a computer system). During reception, information may be received from analog processing component 120 as a digital data stream from an analog-to-digital converter, for example. Digital processing component 110 may perform a variety of functions for transmitting and receiving data including, for example, Fourier Transforms, Inverse Fourier Transforms, coding or decoding (e.g., for error correction), and a variety of other processing steps that occur on received and transmitted digital signals. During transmission, digital signals are transferred to an analog processing component 120. Analog processing component 120 may include analog-to-digital and digital-to-analog conversion, filtering, gain control, and frequency up coversion and down conversion, for example, to translate the digital information into an analog waveform that may be transmitted on antenna 121. The analog waveform is received by the other antenna 131 and processed by analog processing component 130. The received waveform may be amplified, down converted, filtered, and converted back into the digital domain. Digital processing component 140 in the receiving system may receive streams of digital information to be processed and provided as an output of the wireless system.

One problem associated with wireless communication systems involves synchronizing the transmitting and receiving systems so information may be accurately transmitted and received. For example, the data formats of the transmitted information may include precise timing characteristics. Additionally, processing the digital streams of data that flow from the analog processing component (the "analog front end") may require that the digital processing component configure the analog front-end in particular ways at very precise periods of time. For example, FIG. 1B illustrates one wireless transmission scheme know as frequency hopping. In a frequency hopping wireless system, transmitted data may be modulated at different frequencies at different times. For example, data may be transmitted on a frequency channel 101 by modulating the analog signals at a frequency of f1. At other times, data may be transmitted on frequency channels 102 and 103 by modulating the analog signals at frequencies of f2 or f3. In a frequency hopping system, data transmission may move from one frequency to the next at certain points in time. In order to receive the transmitted data, the receiving system must accurately track the changes in frequency of the transmitting system. Thus, the receiving system must be synchronized in time with the transmitting system so that, for example, when the transmitting system changes from one frequency to another, the receiving system changes frequencies at the same time. Moreover, the receiving system must have some method of determining the frequencies that the transmitting system is hopping between. Other timing requirements may be associated with the digital formats of the transmitted data (e.g., packet formats) and the modulation techniques used. Synchronization of the transmitting and receiving systems becomes particularly important as data rates increase.

FIG. 2 illustrates a wireless communication system protocol. The example data transmission format shown in FIG. 2 illustrates some of the problems solved by embodiments of the present invention. The data transmitted from a wireless system may be used to perform a variety of functions. The structure of a data packet may include a preamble 201 used for synchronization, a second preamble 202 used for channel estimation and calibration, and then a payload carrying data. The synchronization preamble may comprise multiple blocks of data as shown at 220. In one example system, the synchronization preamble may include 24 blocks. Each block may also be referred to as a "symbol." The symbols are transmitted sequentially by the transmitting system and received by the receiver. The transmitting system may send each symbol using a different frequency. For example, the first symbol, S1, may be transmitted on frequency f1, the second symbol, S2, may be transmitted on frequency f2, and the third symbol, S3, may be transmitted on frequency f3. The fourth symbol, S4, may be transmitted on frequency f1 again. This is an example of a frequency hopping pattern wherein the frequency hopping sequence is [f1, f2, f3]. Wireless systems may use a variety of other hopping sequences (i.e., hopping patterns).

The time domain illustration of a symbol is illustrated at 230. The start of the symbol is at t1. A time t3, symbol 230A ends and symbol 230B begins. Thus, times t1 and t3 represent the time domain boundaries of the symbol. Some protocols may include a division of the symbol into two components. The first component includes a data transmission component from time t1 to t2, and the second component of the symbol from t2 to t3 may be zero. If a total of 165 samples of a received symbol are obtained, 128 samples may include data and 37 samples may be zero, for example. For synchronization, the symbols may be a pseudo-random number sequence (e.g., "PN sequences" or "PN codes"). The data represented by the samples may be an orthogonal frequency division multiplexed ("OFDM") signal, for example, as shown at 240. The baseband OFDM signal illustrated may include 128 subcarriers spread out between −264 MHz to +264 MHz. Of the 128 subcarriers, 112 may be spaced symmetrically about zero frequency, with 56 subcarriers such as $f_{S1}$, $f_{S2}$, though $f_{SN}$, both above and below zero frequency. Each subcarrier may contain 2-bits of data, for example. Data may be encoded in the OFDM signal 240 and transmitted as a symbol during the period from t1 to t2. For a 264 MHz bandwidth OFDM symbol, the system may be sampled at 528 MHz. Accordingly, the symbol period (from t1 to t3) may be about 312.5 nanoseconds ("ns"). Therefore, a wireless system receiving symbols may be required to switch from one carrier frequency f1 to another carrier frequency f2 synchronously with the transmitting system, for example, with a precision of about 1 clock cycle, or about 2 ns). In particular, the receiving wireless system may have to reconfigure analog component to receive different signals at different frequencies at different times. The timing of analog reconfiguration should be such that the analog receiver circuits are able to process incoming data. Accordingly, changes to analog circuits must be timed precisely with changes in the transmitted signals. More generally, the timing of analog and digital processing steps may require close alignment in time with timing characteristics of received data.

Thus, there is a need for improved synchronization in wireless systems. The present invention solves these and other problems by providing systems and methods for synchronizing wireless communication systems.

SUMMARY

Embodiments of the present invention include systems and methods for synchronizing wireless communication systems. In one embodiment the present invention includes a wireless communication system comprising an analog receiver for receiving a plurality of symbols on a plurality of frequency channels, each symbol lasting a first time period, a reference frequency generator for generating a periodic reference signal having a period equal to the first time period of each symbol, and a channel controller coupled to the reference frequency generator, the channel controller generating a command to the analog receiver to change from one frequency channel to another frequency channel a predetermined amount of time after the reference frequency signal enters a predetermined state.

In one embodiment, the present invention further comprises a delay coupled to the reference frequency generator, wherein the delay triggers the channel controller to generate said command a predetermined amount of time after the reference frequency signal enters said predetermined state.

In one embodiment, the reference frequency generator is a counter, and wherein said command is generated a predetermined amount of time after said counter reaches a predetermined value.

In one embodiment, the present invention further comprises a plurality of correlators, wherein each correlator receives a digital representation of said symbols and correlates each symbol with a plurality of reference values, and in accordance therewith, generates correlation results, and wherein the correlation results control the commands generated by the channel controller.

In one embodiment, the correlation results for each symbol are compared to a threshold.

In one embodiment, the correlation results for each symbol include a plurality of correlation results, and wherein at least one of said plurality of correlation results is stored and associated with a state of said reference frequency signal.

In one embodiment, the correlation results are compared against a first threshold for a first time period and the correlation results are compared against a second threshold for a second time period.

In one embodiment, the present invention further comprises a memory for storing a time each symbol is detected.

In one embodiment, the present invention further comprises a memory for storing a plurality of values indicating the number of times a corresponding plurality of symbols are detected at a particular time.

In another embodiment, the present invention includes a method of receiving information in a wireless communication system comprising receiving a plurality of symbols on a plurality of frequency channels, each symbol lasting a first time period, generating a reference frequency having a period equal to the first time period of the symbol, and generating a channel control signal to change from a first channel to a second channel at a predetermined point in time of the reference frequency period.

In one embodiment, the present invention further comprises detecting a first symbol in said plurality of symbols and starting the reference frequency in response to detecting the first symbol.

In one embodiment, generating the reference frequency comprises operating a counter that cycles through a plurality of values during each reference frequency period, and wherein the predetermined point in time of the reference frequency period corresponds to one of said plurality of values.

In one embodiment, the present invention further comprises storing a delay value.

In one embodiment, the present invention further comprises detecting said predetermined point in time of the reference frequency period and generating said channel control signals a predetermined amount of time after said detection.

In another embodiment, the present invention includes a baseband processor comprising a symbol processor that detects symbols received by said baseband processor, a reference frequency generator that generates a periodic reference signal having a period equal to a symbol period, control logic coupled to the reference frequency generator, wherein the control logic receives the reference frequency signal and generates an output when the reference frequency signal is in a predetermined state, and a channel controller coupled to the output of the control logic, the channel controller generating frequency synthesizer control signals in response to the control logic output signal a predetermined amount of time after receiving said output from said control logic.

In one embodiment, the reference frequency generator is a counter and the predetermined state is a predetermine value of said counter.

In one embodiment, the reference frequency generator is a first counter and the control logic includes a second counter for generating said control logic output signal after counting for said predetermined amount of time.

In one embodiment, said symbol processor includes a plurality of cross-correlators, and wherein the channel controller generates first frequency control signals corresponding to a first frequency pattern if a first of said plurality of cross-correlators indicates that a symbol has been received, and the channel controller generates second frequency control signals corresponding to a second frequency pattern if a second of said plurality of cross-correlators indicates that a symbol has been received.

In one embodiment, the reference frequency generator is a counter, and wherein said symbol processor includes a plurality of cross-correlators that generate a plurality of correlation results for each symbol, and wherein each correlation result corresponds in time to a plurality of values of said counter, and wherein a representative value of said counter is stored for each of a plurality of received symbols and used to produce a final value for generating said control logic output.

In another embodiment, the present invention includes a method of receiving information in a wireless communication system comprising receiving a digital signal at a first data rate, filtering the digital signal, decimating the digital signal to a second data rate, correlating the digital signal with a plurality of reference values, and programming a synthesizer with one of a plurality of frequency patterns corresponding to the reference value resulting in the largest correlation result.

In one embodiment, the present invention further comprises comparing the correlation results against a first threshold during a first time period and comparing the correlation results against a second threshold during a second time period.

In one embodiment, the present invention further comprises comparing the correlation results against a first threshold, and in accordance therewith, detecting an increase in a first correlation result, and generating a hopping command a predetermined amount of time after detecting said increase in said correlation result.

In one embodiment, the digital signal includes a plurality of symbols having a first period, the method further comprising operating a counter having a period equal to the first period.

The following detailed description and accompanying drawings provide a better understanding of the nature and advantages of the present invention.

BRIEF DESCRIPTION OF THE DRAWINGS

FIG. 6 illustrates pattern selection and synchronization techniques according to one embodiment of the present invention.

FIG. 7 illustrates a reference symbol that may be used in one embodiment of the present invention.

DETAILED DESCRIPTION

Described herein are techniques for systems and methods for synchronizing wireless communication systems. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1A:
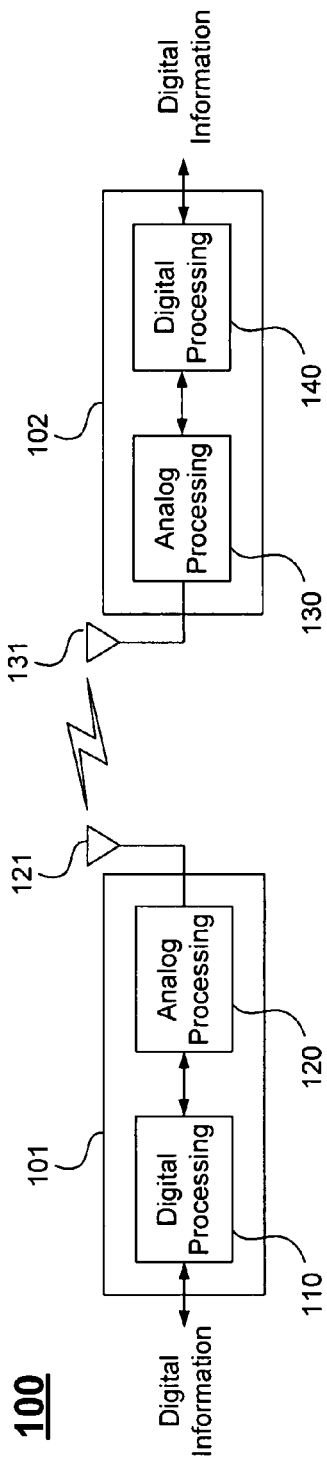
FIG. 1A illustrates a wireless communication system.
Figure 1B:
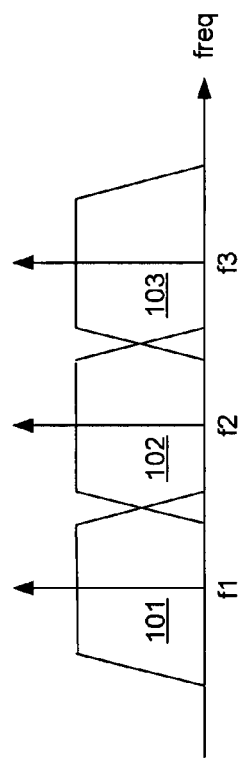
FIG. 1B illustrates frequency hopping in a wireless communication system.
Figure 2:
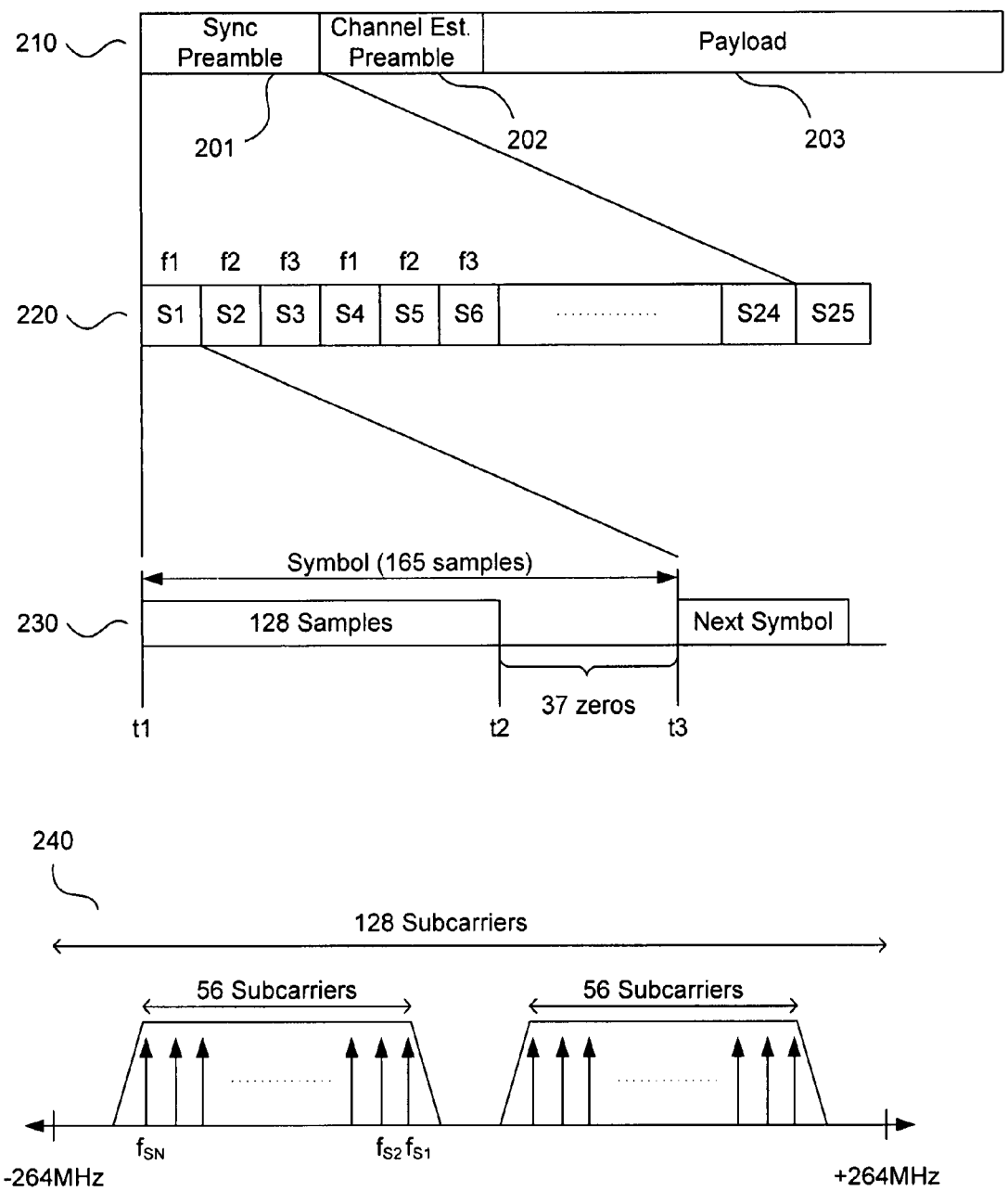
FIG. 2 illustrates a wireless communication system protocol.
Figure 3:
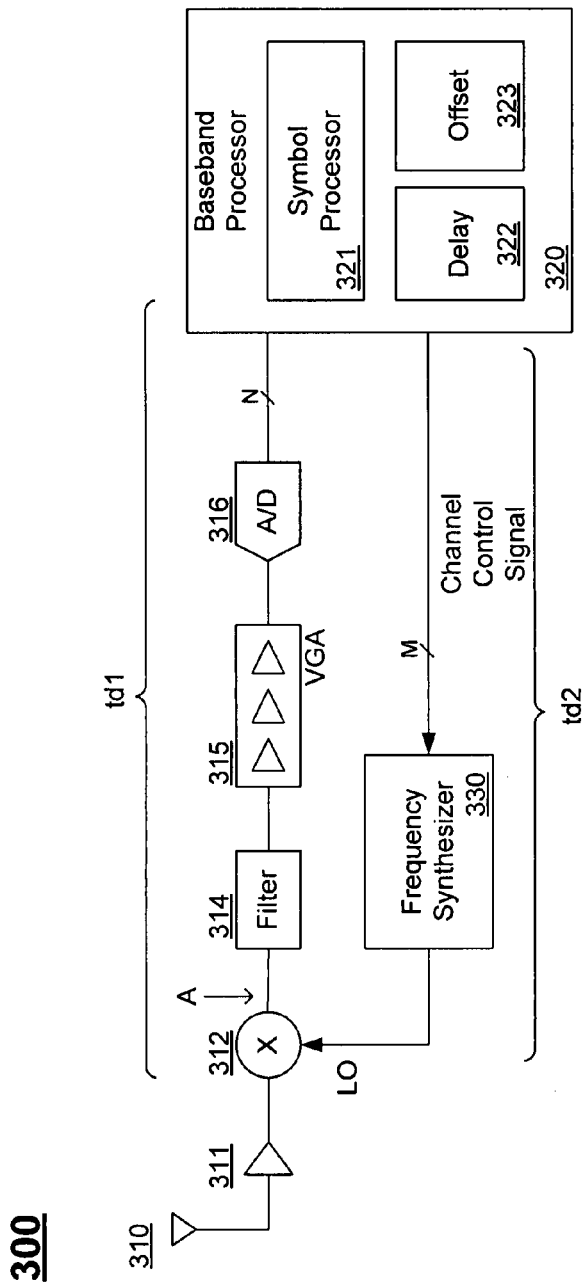
FIG. 3 illustrates a receive path for a wireless communication system according to one embodiment of the present invention.

FIG. 3 illustrates a receive path for a wireless communication system according to one embodiment of the present invention. Wireless communication system 300 includes an antenna 310, amplifier 311, down converter 312, frequency synthesizer 330, filter 314, variable gain amplifier ("VGA") circuit 315, analog-to-digital converter ("A/D") 316, and baseband processor 320. Antenna 310 receives wireless signals and couples the received signals to the input of amplifier 311. Amplifier 311 may be a low noise amplifier ("LNA") for amplifying very low voltages representing the received signals. The received signals may be modulated at different carrier frequencies at different times as described above. In this example, the signals are down converted using down converter 312. Down converter 312 may be a mixer circuit having inputs coupled to the output of LNA 311 and second inputs coupled to a frequency synthesizer 330. Frequency synthesizer 330 may be a programmable frequency synthesizer for generating different frequencies in response to control signals received from baseband processor 320. Baseband processor 320 may change the control signals to reprogram synthesizer and thereby change the down conversion frequencies for down converting received RF signals at different times. The down converted signal at the output of down converter 312 is referred to as a "baseband signal." The output of down converter 312 is coupled through a filter 314 to the input of an VGA 315 for amplifying the baseband signal. The output of VGA 315 is coupled to the input of A/D 316 and sampled. The output of A/D 316 is a digital data stream, which is coupled to the input of baseband processor 320 for digital signal processing. The sample rate of the A/D 316 may be 1.056 giga-samples per second ("Gsps"), for example. The digital representations of the received symbols may be processed by symbol processor 321, which may be included as part of baseband processor 320, for example. Symbol processor 321 may detect incoming symbols and synchronize changes in the frequency synthesizer to be coincident with the symbol boundaries at the mixer.

For example, in a frequency hopping systems, frequency synthesizer 312 may be required to change between down converter frequencies at the time boundary between adjacent symbols. Embodiments of the present invention may be used to program the frequency synthesizer to change the down conversion frequency at the time boundary of each symbol. To achieve this, it is desirable to change the synthesizer frequency provided at the input of down converter 312 at the moment a symbol ends and the next symbol begins (the symbol boundary). As a symbol is received, there is a processing delay td1 (e.g., analog and/or digital) from the output of the mixer to symbol processor 321. The delay td1 represents the time for the end of a full symbol to propagate through the analog and digital circuit to be detected by symbol processor 321. A delay td2 represents the amount of time from detection of a symbol to a change in frequency of mixer 312. For example, when symbol is detected in symbol processor 321, there may be a delay between the point in time of detection and the time it takes for baseband processor to reprogram frequency synthesizer 330 and for the new output frequency to arrive at the down convertor 312. There may also be a settling time for down converter 312. As illustrated below, symbol processor 321 may detect a symbol before the entire symbol has been received. For example, symbol processor 321 may detect a first portion of the symbol, and cause control signals to reprogram frequency synthesizer 330 to change frequency. However, after symbol processor 321 detects a symbol, it may delay issuing changes to frequency synthesizer 330 so that down converter 312 changes the down conversion frequency at precisely the boundary between the symbol being received and the next symbol. Accordingly, baseband processor 320 may include a delay 322 for delaying the issuance of frequency control signals (sometimes referred to as "channel control signals," "frequency hopping signals," "hopping signals," or "hop control signals"). In some applications, the delay may be approximately equal to the total symbol period less the portion of the symbol period used for detecting the symbol, less the propagation delays from the output of down converter 312 to symbol detection, and less the propagation delay from detection to changing the frequency of the down converter.

In some applications, symbol detection may not result in an exact point in time or a precise cycle of a baseband system clock. Symbol detection results may non-idealities leading to multiple detection results, such as clusters of peaks described below, for example. Accordingly, embodiments of the present invention may include an offset value (an offset of a counter period, for example) for determining the point in time to start the delay. A timebase counter may be used to establish a timebase for the receiving system. The offset value may be determined by analyzing symbol detection results, such as cross-correlation results described below. The offset value may be related to the state of the timebase counter, so that when the timebase counter enters a particular state, the system triggers a change in the control signals to the frequency synthesizer, which may include starting delay 322.

Figure 4A:
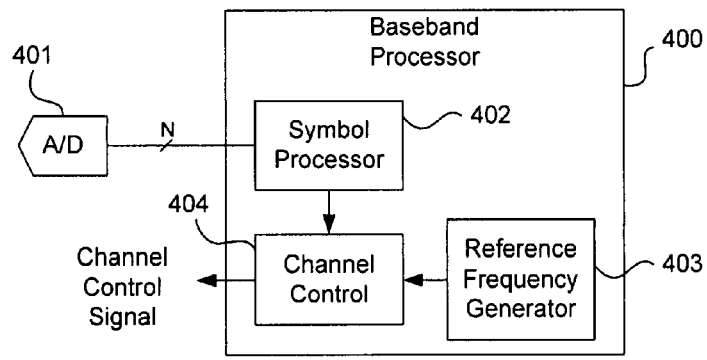
FIGS. 4A-D illustrate a baseband processor for use in a wireless communication system according to one embodiment of the present invention.
Figure 4B:
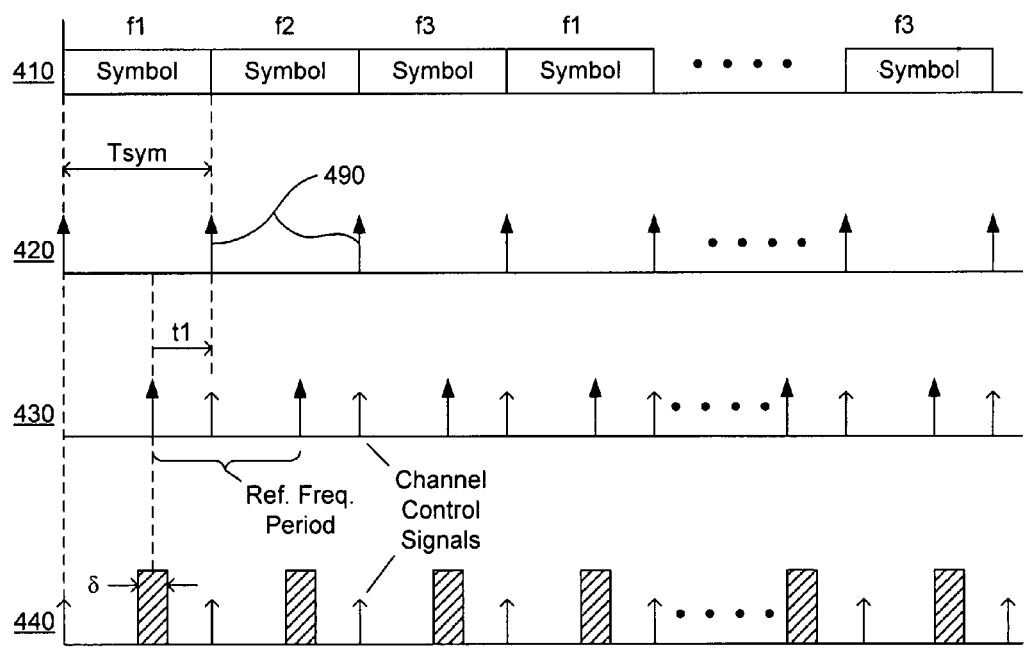

FIGS. 4A-D illustrate a baseband processor for use in a wireless communication system according to one embodiment of the present invention. FIG. 4A illustrates a baseband processor 400 including a symbol processor 402, reference frequency generator 403, and channel control 404. Symbol processor 402 receives digital data from an A/D 401 over N bit lines. The digital data may include symbols, which are detected by symbol processor 402. Reference frequency generator 403 generates periodic reference signal that may be used as a timebase for synchronizing received symbols with functions carried out on the wireless receiver. In one embodiment, reference frequency generator 403 generates a periodic signal having a period equal to the symbol period. FIG. 4B illustrates the timing of symbols and the reference frequency generator 403. Symbols are received sequentially as shown at 410. The modulation frequencies for the symbols may be different according to the particular frequency hopping pattern used by the transmitting wireless system. The symbols are first down converted (using a mixer circuit) and then sampled by A/D 401. The symbol periods, Tsym, are illustrated at 420. The arrows 490 represent the boundaries between adjacent symbols (symbol boundaries). The period of a signal from the reference frequency generator 403 (the reference frequency signal period) is illustrated at 430 and 440. FIG. 4B illustrates that the reference frequency period may not be coincident with the symbol boundaries. As mentioned above, it may be desirable to generate channel control signals at a point in time just before the symbol boundary so that the frequency synthesizer can be reprogrammed to a new frequency to down convert the next incoming symbol. Thus, a delay of t1 at 430 is introduced so that the channel control signals are reprogrammed at the proper time. Reference frequency generator 403 may be started by detecting a symbol, for example, and the start of a delay may be triggered either by detection of a symbol or detection of a particular state of the reference frequency generator. As illustrated at 440, symbol detection may include an uncertainty error, "δ". Thus, the system may first operate in an initialization phase to account for the uncertainty. Accordingly, in one embodiment, the delay may be triggered by symbol detection during a first period of time (e.g., an initialization phase) and the delay may be triggered by a predetermined state of the reference frequency signal during a second period of time (e.g., a post-initialization or normal operation phase). The state of the reference frequency signal for triggering the delay may be calculated by analyzing the detected symbols. A specific example of symbol detection and analysis is provided below.

Figure 4C:
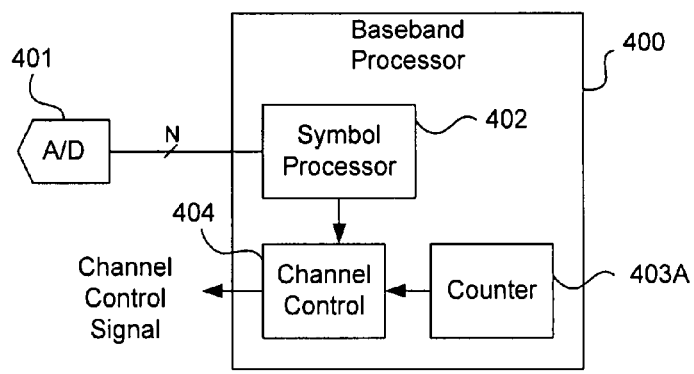
Figure 4D:
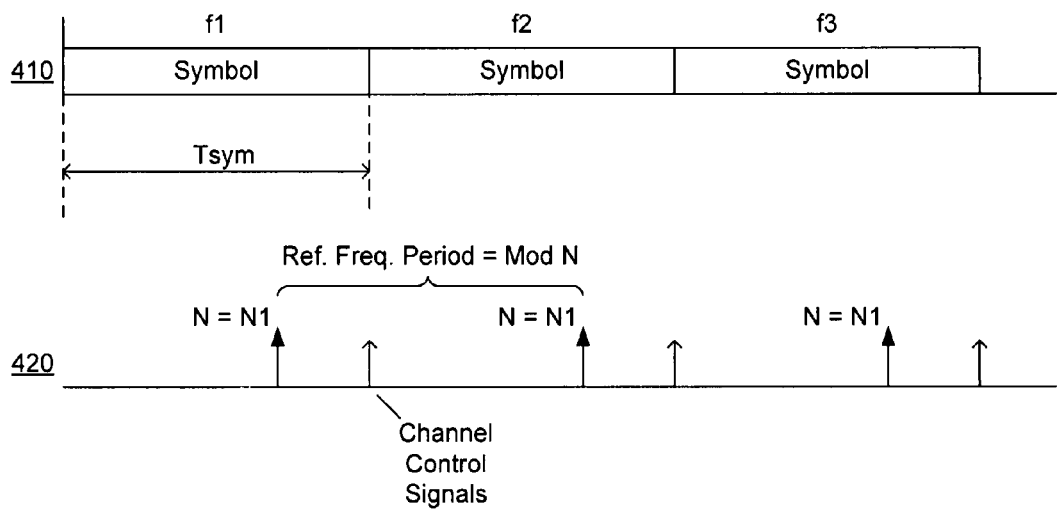

FIGS. 4C and 4D illustrate an example of a baseband processor for use in a wireless communication system according to one embodiment of the present invention. In this example, the reference frequency generator is implemented using a counter 403A. Counter 403A may have a count period equal to the symbol period Tsym shown in FIG. 4D at 410. Counter 403A may start counting when a symbol is detected. The counter receives a system clock (not shown) and may count for a time Tsym and then restart. As shown at 420 in FIG. 4D, the reference frequency period of counter 403A is equal to the symbol period Tsym, but the boundaries may not be coincident. As illustrated in FIG. 4 at 420, counter 403A reaches a count value of N=N1 at the same period as the symbols are received. Counter 403A may increment at the same rate as the sample period of the symbols, for example. Accordingly, each value of counter 403A may correspond to a particular digital sample of a symbol. Thus, by triggering a delay when counter 403A reaches a particular state (e.g., a predetermine or specified counter value), the control signals may be transmitted at a time very close to the symbol boundary, and the frequency synthesizer may be reprogrammed to down convert incoming symbols received on other frequencies. Counter 403A may be a modulo-N counter, for example. In one embodiment, counter 403A may be a modulo 165 counter.

Figure 5A:
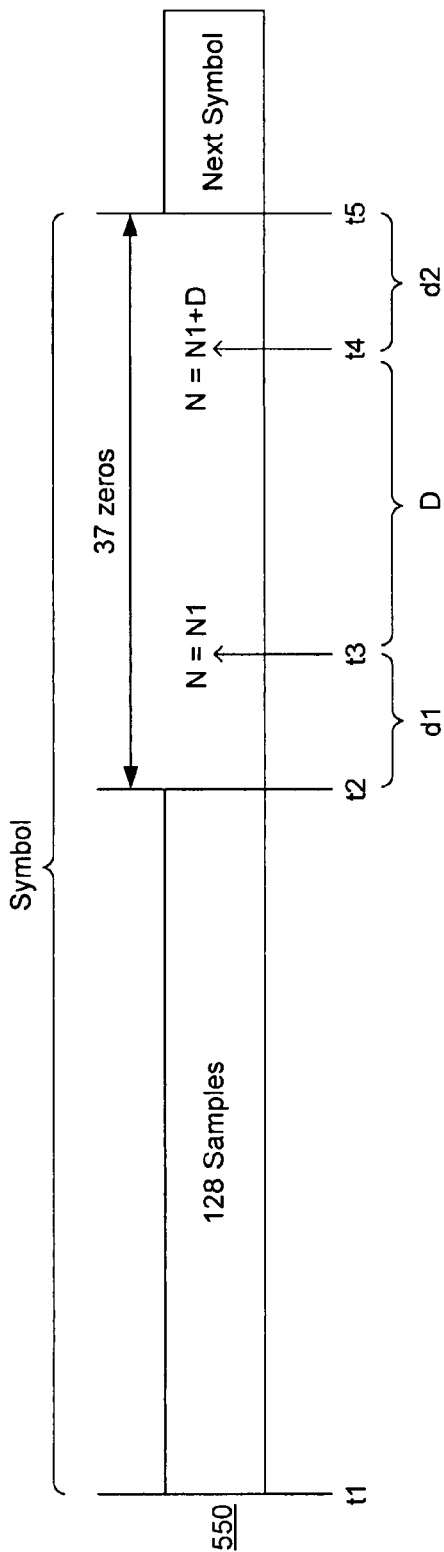
FIGS. 5A-B illustrate a baseband processor for use in a wireless communication system according to another embodiment of the present invention.
Figure 5B:
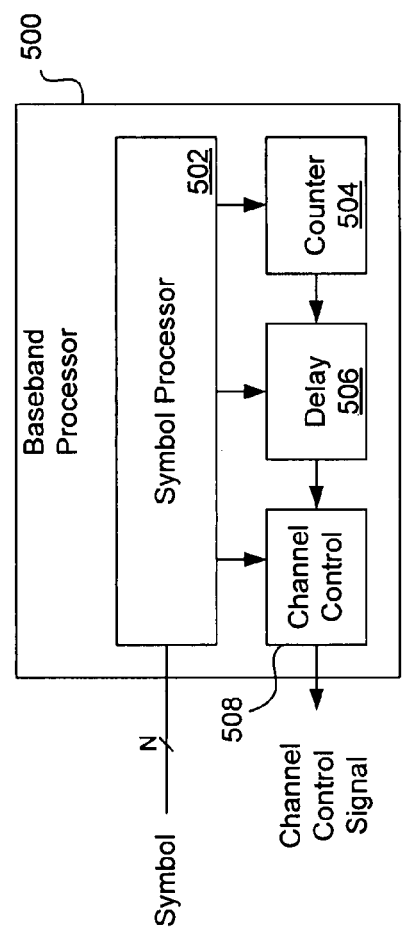

FIGS. 5A-B is an example of a baseband processor for use in a wireless communication system according to another embodiment of the present invention. This example illustrates a symbol 550 that starts at time "t1", ends at time "t5", and includes 165 samples. The sample rate may be 528 Msps, for example. The first 128 samples of the symbol carry data, which may be encoded using quadrature amplitude modulation ("QAM") techniques, for example. The following 37 samples of the symbol may be set to zero. Symbol 550 may be received at an analog front end, digitized for processing on N digital bit lines (e.g., 5 bits), and coupled to the input of symbol processor 502 included as part of baseband processor 500. Symbol processor 502 may detect incoming symbols by analyzing the data stored in the first portion of the symbol (e.g., the first 128 samples of the symbol). A time delay, d1, may exist between the time a symbol is down converted and the time the symbol is detected. Thus, the end of a symbol at the output of the down converter may occur at time t2, and detection may occur at time t3. Delay, d1, may include a 2-3 sample delay (about 4-5 ns) due to analog filters and variable gain amplifiers in the analog front end and a 9-10 sample delay (about 19 ns) due to a digital decimation filter shown below, for example. As illustrated in FIG. 5B, baseband processor 500 may include a reference frequency generator implemented as a counter 504 for setting a timebase ("a timebase counter"), a delay 506 for delaying issuance of channel control signals, and a channel controller 508 for generating channel control signals to change the frequency of a frequency synthesizer (not shown). Because the channel control signals may be used for reprogramming the frequency synthesizer to down convert different carrier frequencies used in a frequency hopping system, these signals are sometimes referred to as hop control signal and hopping commands. The system may also include a delay, d2, between issuance of the channel control signals and settling of the analog channel to receive a new down conversion frequency. Delay, d2, may include a delay from the time the hopping commands are dispatched to the time the commands actually reach the frequency synthesizer (about 2-3 ns), synthesizer settling time (less than 5 samples or 9.5 ns), and the settling time of the analog channel including the mixer and analog filter transient response (about 4 samples or 8 ns). Thus, the system may include a delay 506, which may be programmable, introduced between the time the symbol is detected and the time the hopping commands are dispatched. In one embodiment, counter 504 has a count period equal to the symbol period, and the delay is triggered every time the counter reaches a particular value N=N1. As illustrated in FIG. 5A, the time when counter 504 has a value of N=N1 is the time to issue a signal to start delay 506. When delay 506 ends, the new values of channel control signals may be sent to the synthesizer, and accordingly, the analog front end will be ready to receive the next symbol and down convert the symbol from a new down conversion frequency at t5. By changing the frequency of the synthesizer at the last possible moment before reception of a new symbol, the system is able to capture the maximum amount of information in the wireless channel available for each modulation frequency, and thereby reduce distortion and SNR.

FIG. 6 illustrates pattern selection and synchronization techniques according to one embodiment of the present invention. A baseband processor according to embodiments of the present invention may include one or more cross-correlators 601A-C for detecting received symbols. In one embodiment, the sequence of frequencies (i.e., hopping patterns) used by the transmitting system may be determined in the baseband by analyzing the received data against a plurality of reference symbols 602A-C. If data received in a symbol correlates or otherwise matches one of the reference symbols, such a result may indicate the hopping pattern that is being used by the transmitting system. For example, in one application, the transmitting system may transmit symbols including a pseudo-random number sequence (e.g., "PN sequences" or "PN codes") in each symbol for the first 24 symbols. Such example reference symbols are illustrated by symbols 700 in FIG. 7. The first PN sequence may be transmitted using a hopping pattern of {f1, f2, f3, f1, f2, f3, etc . . . }, for example. Examples of hopping patterns are shown below. Different PN sequences may indicate different hopping patterns. Accordingly, different PN sequences may be used as the different reference symbols so that if one of the correlators 601A-C indicates a match, the system is able to identify the hopping pattern as the pattern corresponding to the PN sequence that produced the match. More generally, reference symbols 602 may be used to detect the hopping pattern by associating each reference symbol with a particular hopping pattern (e.g., by using the output of particular cross-correlators to determine hopping pattern selection).

In this example, a channel controller 610 includes a hopping pattern state machine 611. The correlator 601A-C that generates a match (a value indicating a correlation between a received symbol and the reference symbol) is selected at 603 and coupled to the input of hopping pattern state machine 611 to program the particular hopping pattern. Detection of a symbol by correlators 601A-C may also trigger the start of a modulo-N counter 604. Counter 604 has a period equal to the period of the received symbols. Counter 604 is compared to an offset value (N1) stored at 605 by comparator 606. Offset value N1 may be set during initialization, for example. When the value of counter 604 matches the offset value, a delay 608 is triggered. Delay 608 may be programmable using delay register 607, for example. At the end of a programmed time period, delay 608 triggers channel controller 610 and hop commands are dispatched.

Figure 8:
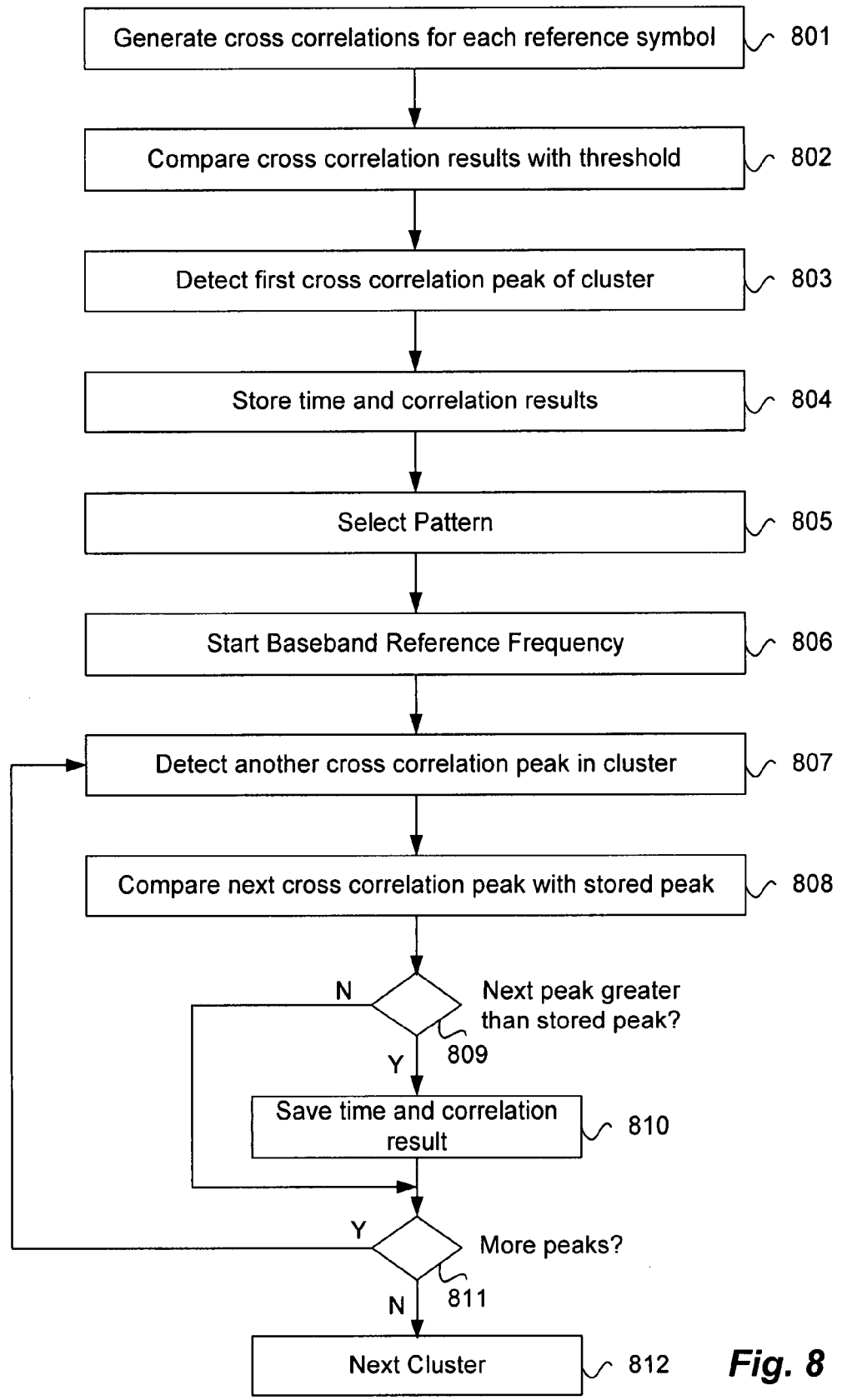
FIG. 8 illustrates a pattern selection and synchronization based on cluster analysis according to one embodiment of the present invention.

FIG. 8 illustrates a pattern selection and synchronization based on cluster analysis according to one embodiment of the present invention. In one embodiment, cross-correlators may not generate a single result on a particular sample of the symbol period. Rather, cross-correlators may generate a cluster of results that may be analyzed to generate an offset value. For example, in one embodiment, synchronization may include generating cross-correlations for each reference symbol at 801. At 802, the cross-correlation results may be compared to a threshold value at 802. If a cross-correlation result is greater than a threshold, a first "peak" may be detected from a potential plurality of correlation results for a symbol (i.e., a cluster) at 803. At 804, the correlation results and time the result occurred may be stored. At 805, a hopping pattern may be selected based on the particular correlator generating a "peak." At 806, a baseband reference frequency may be started (e.g., a timebase counter). At 807, another cross-correlation peak in the cluster may be detected. At 808, the next detected peak is compared with the previously stored peak. If the next peak is greater than the stored peak (e.g., or greater than the stored peak by a specified amount), then the new correlation results and time may be saved at 810. If the next peak is less than the stored peak, the process may discard the information for the new peak. If there are more peaks at 811, then peak detection and comparison (at 807-810) are repeated. Subsequent analysis of clusters of correlation results for other symbols received by the system may be analyzed at 812. A detailed example of the steps described above is provided below.

Figure 9:
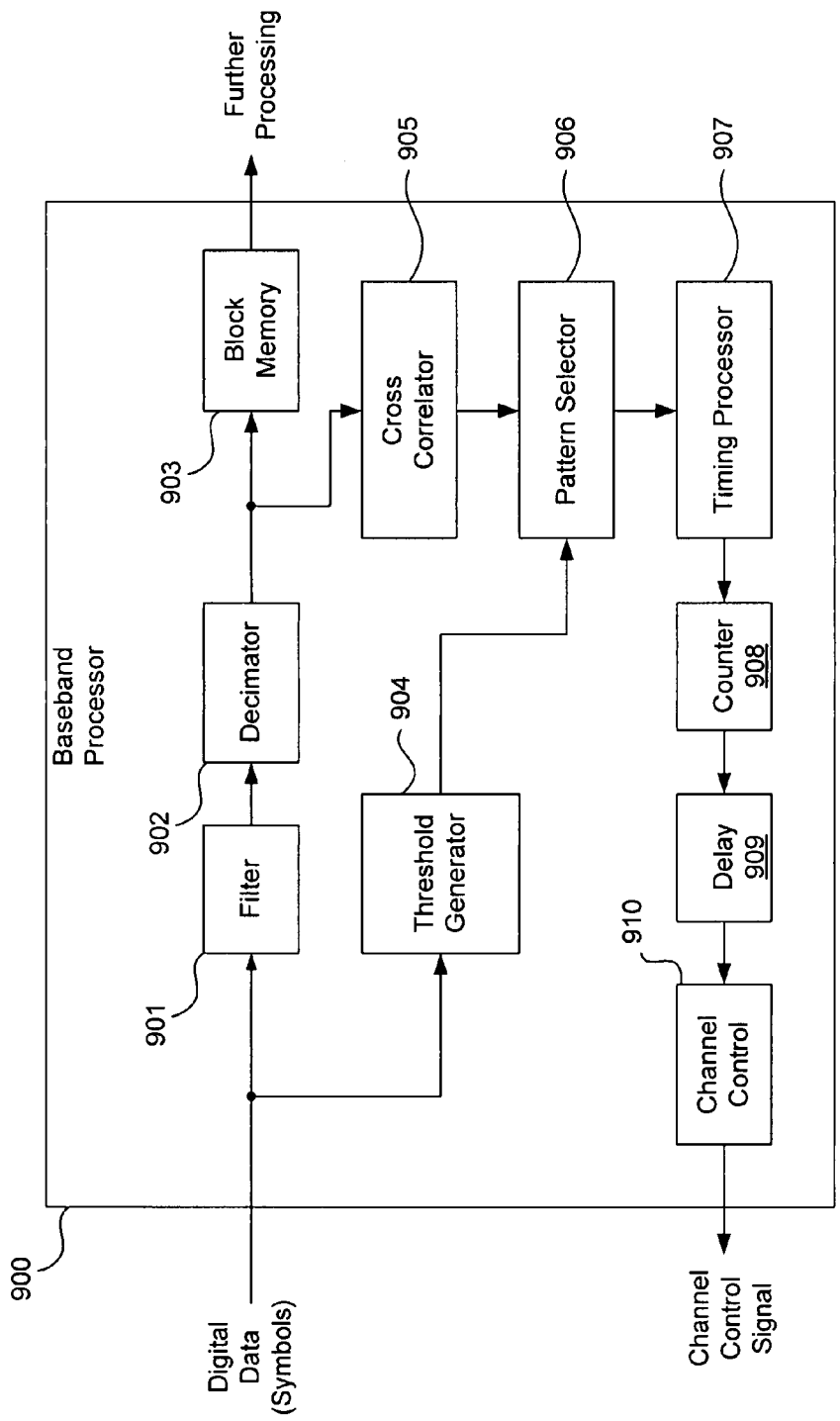
FIG. 9 illustrates a baseband processor according to one embodiment of the present invention.

FIG. 9 illustrates a baseband processor according to one embodiment of the present invention. Baseband processing 900 includes a filter 901, decimator 902, block memory 903, threshold generator 904, cross correlator ("Xcorr") 905, pattern selector 906, timing processor 907, counter 908, delay 909, and channel control 910. Digital data streams are received from analog-to-digital converters ("ADC") in the analog front end (not shown). The digital data may correspond to a plurality of symbols, and may be received at approximately 1.056 Giga-samples per second ("Gsps"), for example. In one embodiment, the digital data may be received separately as in-phase ("I") and quadrature ("Q") digital signals.

Digital data may be received at the input of filter 901. Filter 901 may be used to eliminate signal content such as noise or unwanted signal components (sometimes referred to as "blockers"). For example, the output of an ADC may have a bandwidth from −528 MHz to +528 MHz, but the bandwidth of the signal of interest (i.e., the "target signal") may only be from −264 MHz to +264 MHz. The output of filter 901 is coupled to the input of decimator 902. Decimator 902 reduces the sample rate of the signal by decimating the signal. For example, in one embodiment, a signal with a sample frequency of 1.056 Gsps is decimated down to a 528 Mega-sample per second ("Msps") signal by removing every other sample. Decimation of the signal may cause folding of frequencies into the band of the target signal. Filter 901 reduces the effects of folding of blockers and noise into the frequency range of the signal of interest, thereby improving the signal-to-noise ratio ("SNR") and reducing distortion caused by unwanted signal content.

The output of decimator 901 is coupled to Xcorr 905. As mentioned above, during initialization Xcorr 905 performs cross-correlations on incoming data signals with a plurality of reference sequences and generates output signals for use in hop pattern detection, selection, and synchronization. In one embodiment, Xcorr 905 performs a cross-correlation of the input with a plurality of references and generates an output for each reference. The references may correspond to one of a plurality of hopping patterns, for example Xcorr 905 may include multiple cross-correlators, for example. An example cross-correlator that may be used is in embodiments of the present invention is disclosed in commonly-owned concurrently filed U.S. patent application Ser. No. 11/706,709 entitled Cross-Correlator Circuits and Methods, naming Alireza Mehrnia and Alireza Tarighat-Mehrabani as inventors, the disclosure of which is hereby incorporated herein by reference. An input of pattern selector 906 is coupled to the output of Xcorr 905. An input of pattern selector 906 is also coupled to the output of threshold generator 904.

Threshold generator 904 may receive the incoming digital data from the ADCs and generate a threshold for use in pattern selector 906 for determining if an output signal from Xcorr 905 indicates a match between a received symbol and a reference sequence. Threshold generator 904 may perform statistical calculations on the data such as root-mean-square and average calculations, for example. As described in more detail below, threshold generator 904 may operate in different modes at different times to generate different thresholds at different points in time during digital data processing. In one embodiment, threshold generator 904 may generate a high threshold and a low threshold (i.e., a first threshold that is greater than a second threshold). For example, threshold generator 904 may determine the RMS of incoming data and generate a threshold using a first gain during a first time period. At second time period, threshold generator 904 may generate a threshold using another gain. In one example embodiment, threshold generator 904 may initially calculate the RMS of a first plurality of symbols (e.g., the first 9 symbols) received at a first gain (e.g., Av=12), and then change to a second gain (e.g., Av=10) for the next plurality of symbols (e.g., the remaining symbols). The threshold may be an 11 bit unsigned integer, for example.

Pattern selector 906 receives the threshold from threshold generator 904 and the correlation results from Xcorr 905. Pattern selector 906 may apply the correlation results against the threshold to detect peaks in the signals received from Xcorr 905. For example, peak in one of the cross-correlations may be compared against the threshold. If the peak is greater than the threshold, then cross-correlation results are used for further processing. In one example embodiment described below, pattern selector 906 may provide both I and Q components of a cross-correlation result, a magnitude of the I and Q signals, and an indicator specifying which hopping pattern the results correspond to.

Timing processor 907 is coupled to the output of pattern selector 906. Timing processor 907 programs a time base for the system using cross-correlation results. The time base may be implemented using a counter 908, for example. In one embodiment, timing processor 907 determines an offset for the counter to synchronize received digital data (e.g., symbols) with the counter. The output of counter 908 may be coupled through delay 909 to triggering changes in the analog components through channel control 910 so that the receiving system can track frequency changes in the transmitting system.

Figure 10:
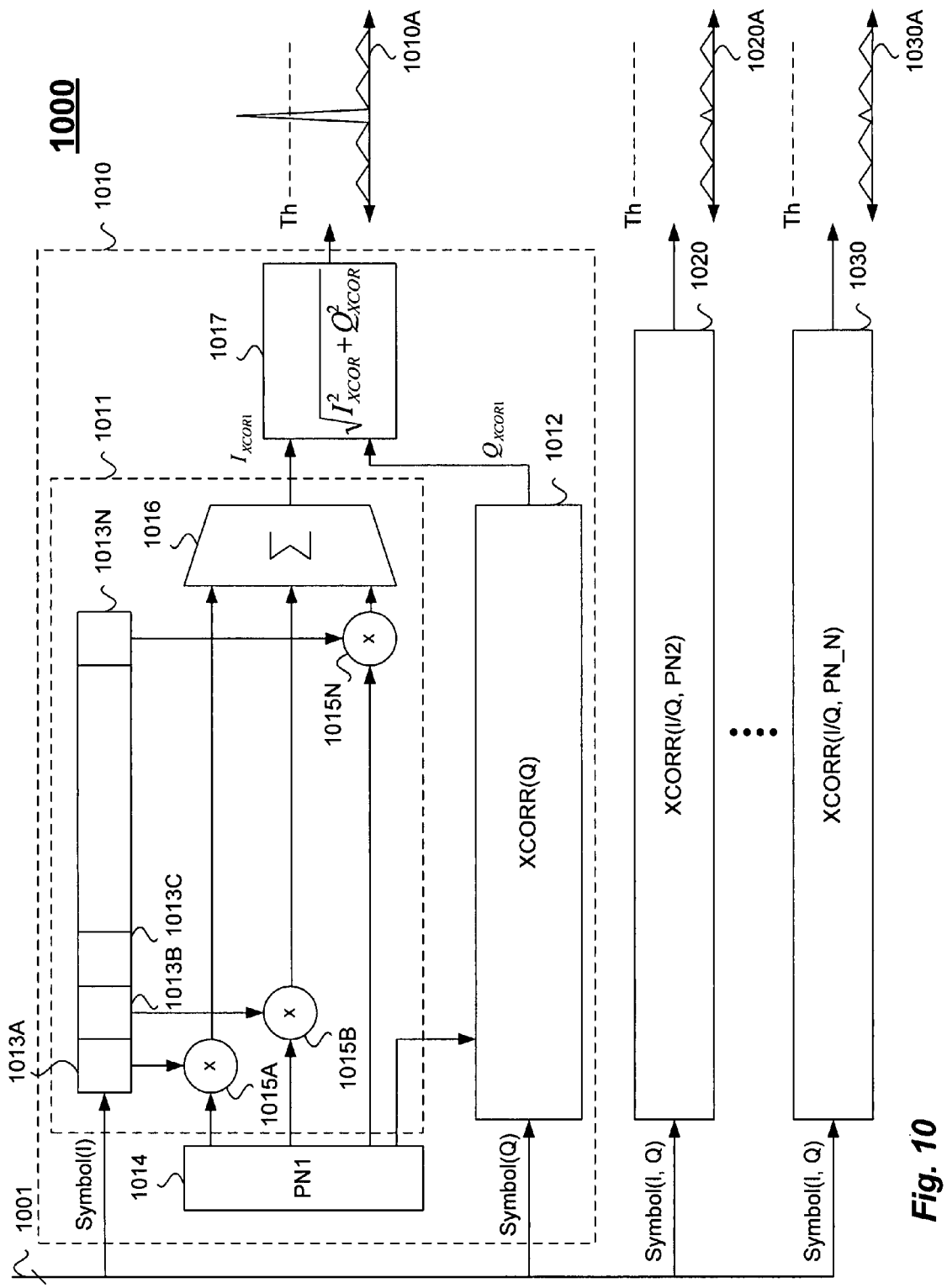
FIG. 10 is an illustrative example of a cross-correlator according to one embodiment of the present invention.

FIG. 10 is an example cross-correlator according to one embodiment of the present invention. Cross-correlator 1000 receives digital data on signal lines 1001. The digital data may include both I and Q components of a signal, may be represented as 6-bit digital values, and may be received at a data rate of 528 MSPS. Cross-correlator ("Xcorr") 1000 may include a plurality of cross-correlation stages 1010, 1020, and 1030 that each receives the input data stream (e.g., I/Q data). Data is received by each cross-correlation stage, and a cross-correlation with different reference values is carried out. The reference values may represent different hopping patterns, for example, and may be PN sequences. Each cross-correlation stage may include a different PN sequence. If received data is cross-correlated against different PN sequences, the stage generating a cross-correlation result above a threshold may be considered to be a match of the incoming data with the PN sequence. Thus, if a particular stage generates a cross-correlation result above a threshold, the hopping pattern may be ascertained.

Cross-correlation stage 1010 includes two cross-correlation circuit blocks 1011 and 1012 for processing I and Q components of a signal received as digital data. An example of the circuit is shown for block 1011. Digital data is received in a storage element 1013, which may be a shift register that receives incoming data by successively shifting in received data values. Each digital data value may be represented as 6 bits in the shift register, and the register may store 128 values, for example. Each digital value in storage elements 1013A, 1013B, 1013C through 1013N may be multiplied by corresponding reference values. For example, the digital value in storage element 1013A may be multiplied by a first reference value of a first PN sequence using multiplier 1015A, and the digital value in storage element 1013B may be multiplied by a second reference value of the PN sequence using multiplier 1015B. Similarly, the received digital values in storage element 1013 are multiplied against each of the stored reference values using other multipliers. The digital outputs of the multipliers are coupled to summing circuit 1016 and added. The output of summing circuit 1016 is coupled to a first input of magnitude calculator 1017. The other input of magnitude calculator is coupled to the output the second cross-correlation block 1012, which includes the substantially the same circuits at block 1011. Magnitude calculator 1017 may square each Ixcorr and Qxcorr input, sum the results, and calculate the square root of the sum, for example, to generate a magnitude value.

Synchronization of a wireless system may include using the cross-correlation results to determine timing requirements of the receiving system. For example, as shown in 1010A, if an incoming digital data stream correlates with the stored reference value 1014, the output of cross-correlation stage 1010 will go up in value. If the same received data is cross-correlated with other reference values in stages (e.g., cross-correlation stages 1020 and 1030), the outputs may not increase if the incoming data does not correlate with the stored reference values as shown at 1020A and 1030A. Ideally, incoming data will match one of the reference values (e.g., PN sequences) when a full symbol is received in storage elements 1013 and cross-correlated against the stored reference values. Accordingly, the period of time when the output of the cross-correlation stage increases also represents the period of time when a full symbol has been loaded into the cross-correlator storage element 1013. The time when the full symbol has been loaded into the storage element 1013 also represents the time when the receiving wireless system has information about the boundaries between the received symbols. Therefore, cross-correlator stage outputs may be used in timing circuits for the receiving system so that the received system can process information without violating symbol boundaries.

Figure 11:
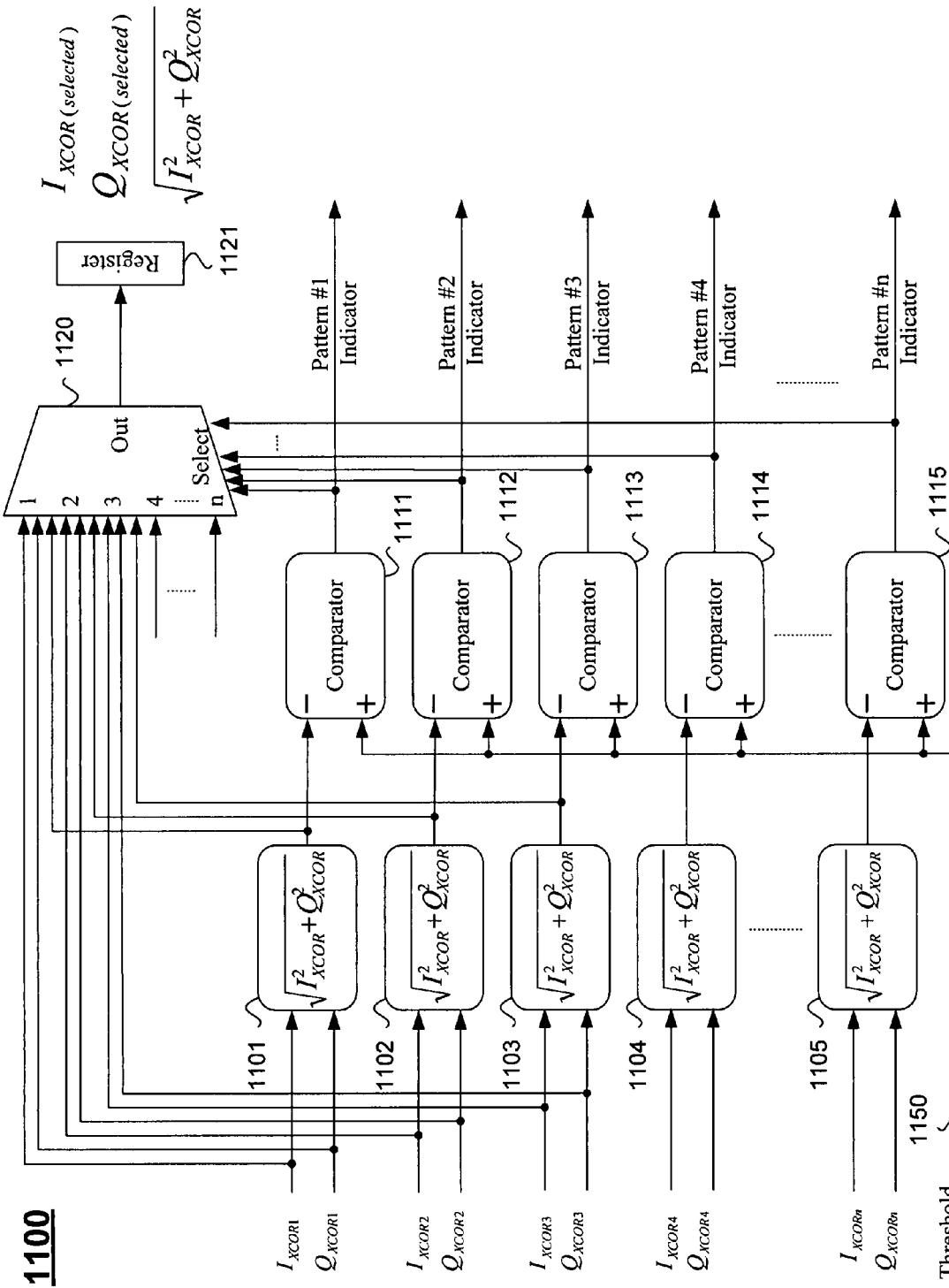
FIG. 11 is an illustrative example of a pattern selector according to one embodiment of the present invention.

FIG. 11 is an example pattern selector 1100 according to one embodiment of the present invention. In this example, magnitude calculators are shown as part of the pattern selector to illustrate the operation of the system. Magnitude calculators 1101-1105 each include inputs coupled to receive Ixcorr and Qxcorr correlation results of the summing circuits from the cross-correlators. The outputs of the magnitude calculators 1101-1105 may be 12-bit unsigned digital values, for example, corresponding to the correlation of the input signal with a different PN sequence. The output of each magnitude calculator 1101-1105 is coupled to inputs of comparators 1111-1115. Comparators 1111-1115 also have inputs coupled to receive a threshold on lines 1150. The threshold may also be a 12-bit unsigned digital value, for example. In this example, comparators 1111-1115 perform a digital subtraction operation. Accordingly the inputs of the comparators coupled to the magnitude calculators are labeled with a minus sign, "−", and the inputs of the comparators coupled to receive the threshold value are labeled with a plus sign, "+". The output of the comparators 1111-1115 may be the sign bit of the result, for example. Thus, if the magnitude of any of the cross-correlation results is greater than the threshold, the sign bit will transition from zero to one (i.e., in this example a positive output will result in a '0' sign bit and a negative output will result in a '1' sign bit). Accordingly, comparators 1111-1115 may be used to determine the hopping pattern of the incoming signal. The following table illustrates hopping patterns that may be selected in an exampe system based on the correlation results with different PN sequences:

| PN Sequence | Hopping Pattern Frequencies (1 = f1, 2 = f2, 3 = f3) |
| --- | --- |
| 1 | {1, 2, 3, 1, 2, 3, 1, 2, 3, ...} |
| 2 | {1, 3, 2, 1, 3, 2, 1, 3, 2, ...} |
| 3 | {1, 1, 2, 2, 3, 3, 1, 1, 2, 2, ...} |
| 4 | {1, 1, 3, 3, 2, 2, 1, 1, 3, 3, ...} |
| 5 | {1, 2, 1, 2, 1, 2, 1, 2 ...} |
| 6 | {1, 3, 1, 3, 1, 3, 1, 3 ...} |
| 7 | {1, 1, 1, 1, ...} |
| 8 | {2, 2, 2, 2, ...} |
| 7 | {3, 3, 3, 3, ...} |

Therefore, in this example outputs of digital comparators are used to indicate which PN sequence has a correlation result above the threshold, and thereby signal the detection of a particular hopping pattern. The outputs of comparators 1111-1115 may also be used to store the relevant cross-correlation results. For example, the outputs of comparators 1111-1115 are coupled to the input of a selection circuit 1120, such as a multiplexer, so that if the output of a comparator is high, the correlation results (e.g., Ixcorr, Qxcorr, and the magnitude calculation of Ixcorr and Qxcorr) may be loaded into a storage element such as register 1121. Accordingly, the output of pattern selector 1100 may include a signal (e.g., on a particular line) indicating which hopping pattern has been selected and cross-correlation results.

Figure 12A:
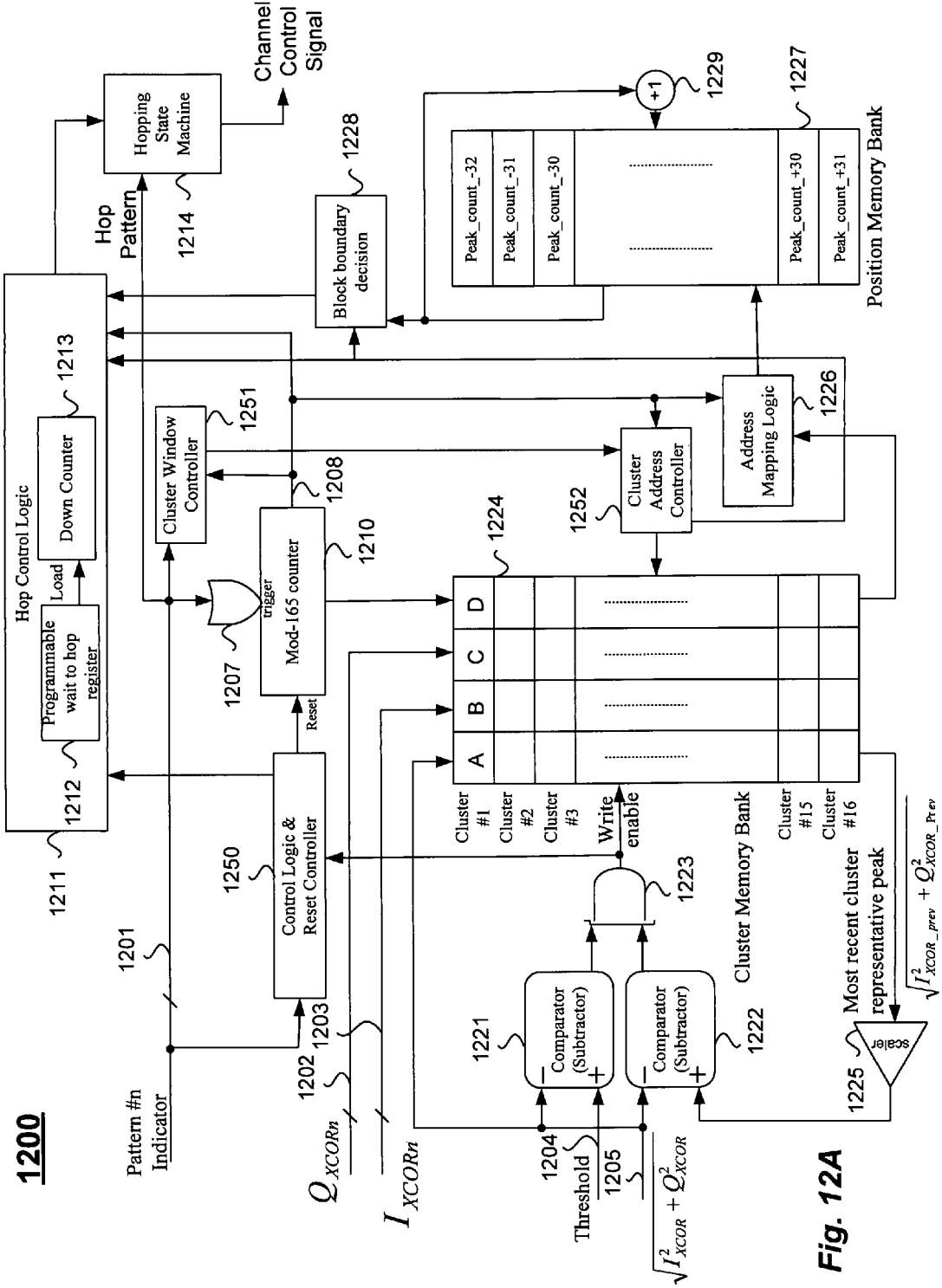
FIG. 12A is an illustrative example of the methods implemented by a timing processor according to one embodiment of the present invention.

FIG. 12A is an illustrative example of the methods implemented by a timing processor 1200 according to one embodiment of the present invention. The timing processor in this example may also be referred to as a peak position processor because cross-correlation peaks from the cross-correlator are processed to set the timing of the system to be synchronous with received symbols. In this example, processor 1200 receives a plurality of signal lines 1201. A positive signal on one of the signal lines 1201 represents the detected reception of a symbol, and may further correspond to the detection of a particular PN sequence. Because the signal lines 1201 may indicate a particular hopping pattern, these signal lines may be referred to as "pattern indicator" lines. Signal lines 1201 are coupled to the inputs of an OR gate 1207. The output of OR gate 1207 is coupled to a counter 1210 for generating a reference frequency. In this example, counter 1210 is an 8 bit modulo-165 free running counter triggered by a system clock (not shown). Thus, once triggered by the detection of a received symbol, counter 1210 will count up to (or down from) 165, generate an output on line 1208, and then start a new count. Accordingly, for a symbol having total of 165 samples, the symbol period is equal to the period of the counter if the sample rate is the same as the clock frequency driving the counter, for example. Thus, counter 1210 may be referred to as a time base counter because it establishes a time base having the same period as the period of received symbols. However, the boundaries of the received symbols and the counter may not be coincident.

Hopping control logic 1211 includes a counter 1213 for implementing a delay. In this example counter 1213 is a down counter, which may be triggered when counter 1210 has a value of zero (e.g., during initialization) or under other conditions described below (e.g., normal mode). It is to be understood that an up or down counter could be used for counter 1213. When a first peak is detected (e.g., by a transition from '0' to '1' on one of signal lines 1201), control logic and reset controller 1250 may trigger down counter 1213 at the same time counter 1210 is started. Down counter 1213 may be programmed to a predetermined delay stored in register 1212. The delay represents the amount of time after a peak has been detected that the system should wait before issuing a hop command. A hopping state machine 1214 is used to issue hop commands that cause a frequency synthesizer (not shown) to change from one frequency to another and thereby change the down conversion frequency for receiving incoming modulated symbols. Hopping state machine 1214 is coupled to receive the pattern indicator lines 1201. Pattern indicator lines 1201 program hopping state machine to implement different hopping patterns (e.g., if pattern #1 indicator line is '1' and the other indicator lines are '0', then hopping state machine may implement a {1, 2, 3, 1, 2, 3, . . . } hopping pattern). When down counter 1213 reaches the end of the count (equal to the programmed delay), it issues a signal to hopping state machine 1214, which in turn generates channel control signals that cause a programmable frequency synthesizer to change from a first frequency in the hopping pattern to a second frequency in the hopping pattern. For example, the output of hopping state machine 1214 may be a 4-bit signal for programming a frequency synthesizer to generate 12 frequencies.

As mentioned above, the cross-correlator may generate correlation results for each received symbol having more than one magnitude value above a threshold. These clusters of peaks may be analyzed by processor 1200 to determine a time for issuing hop commands to a frequency synthesizer. For each received symbol, the correlation results generated are analyzed, and one result is selected and stored in memory. Each correlation result will be received by processor 1200 at some moment in time, which can be recorded as the value of time base counter 1210 at the moment a particular correlation result is detected. The time of the selected correlation result may also be stored in a memory. This process may be repeated for a plurality of symbols and corresponding clusters. After a plurality of clusters have been received, and selected correlation results and associated time values stored in memory, the clusters can be used to determine an offset value for triggering delay counter 1213. For example, in one embodiment, the plurality of time values are used to generate a histogram that represents the number of times a selected result, out of a cluster of correlation results, was received at particular point in time of the time base counter 1210. For example, analysis of clusters may result in the selected result occurring three times when counter 1210 has a value of 12 (i.e., for three different clusters). Similarly, no correlation results may have been selected when counter 1210 had a value of 13 or 14, 2 correlation results may have been selected when counter 1210 had a value of 15, 5 correlation results may have been selected when counter 1210 had a value of 16, and 1 correlation result may have been selected when counter 1210 had a value of 17. The system may select, for example, an offset value of 16 and compare this offset value against the value in time base counter 1210 to systematically start the down counter 1213 as symbols are received at later points in time.

In this example, processor 1200 receives the Qxcorr, Ixcorr, and magnitude calculation of the detected correlation result (See FIG. 10) on signal lines 1202, 1203, and 1205, respectively. The threshold value is received on lines 1204. The first set of correlation results received by processor 1200 is stored in a cluster memory bank 1224. For example, the magnitude result may be stored in a first memory location A, the Ixcorr result may be stored in a second memory location B, the Qxcorr result may be stored in a third memory location C, and the value of the time base counter 1210 on the clock cycle when the results are received (e.g., zero for the first set of results) may be stored in a fourth memory location D. These correlation results shall be referred to hereafter as "peaks" because they represent correlation results having corresponding magnitudes above a threshold value.

Figure 12B:
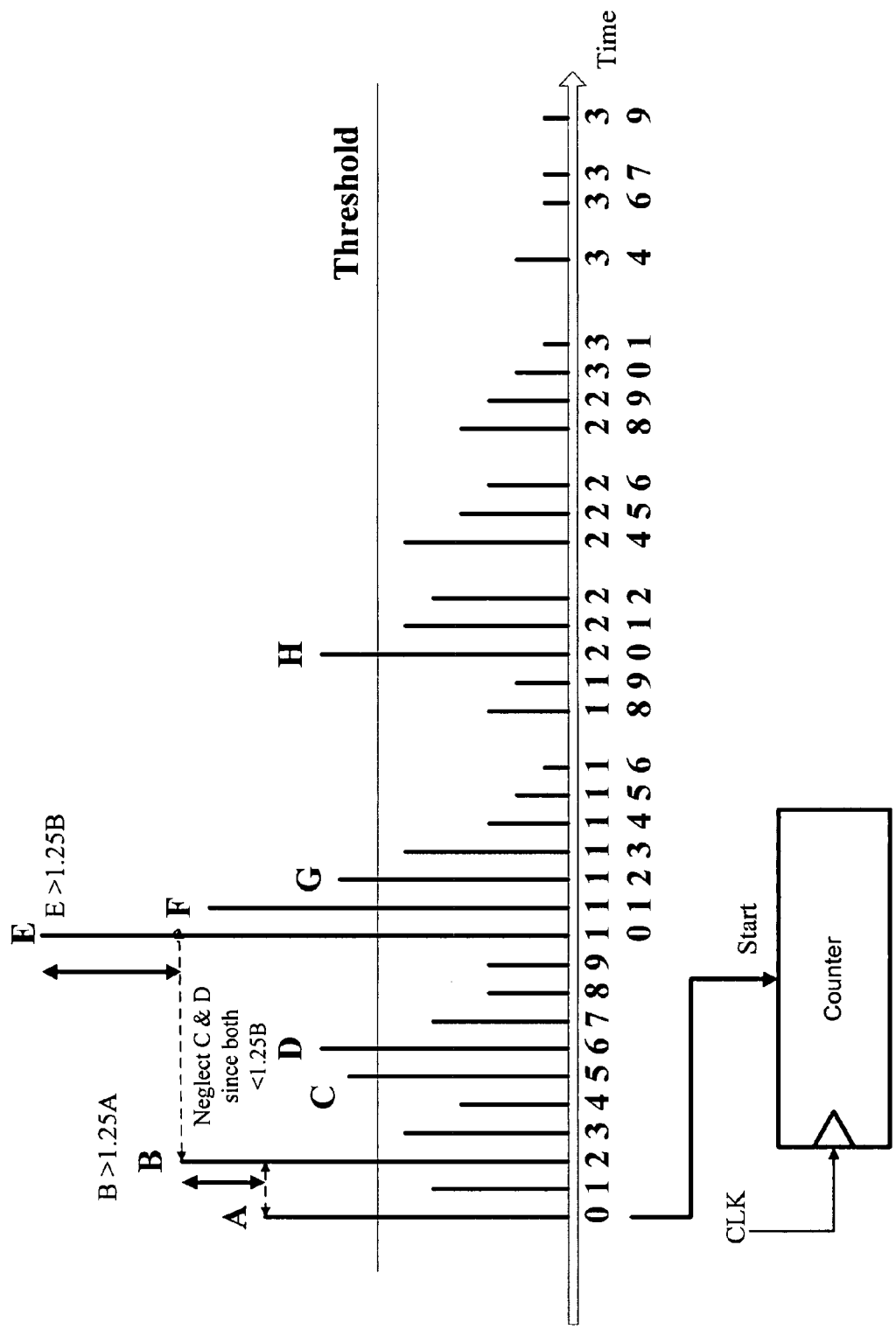
FIG. 12B illustrates the output of a cross-correlation during reception of one example symbol.

The first detected peak is stored in memory 1224. However, for any given symbol, subsequent peaks may be detected at the output of the cross-correlator. FIG. 12B illustrates the output of a cross-correlation during reception of one example symbol. As illustrated in FIG. 12B, there may be a plurality of peaks A-H (i.e., a cluster of peaks or "cluster") above the threshold value for each symbol. In one embodiment, an offset value for triggering a hopping operation may be determined by analyzing the received peaks above the threshold for a received symbol, and selecting one of the symbols corresponding peaks as a representative peak for the cluster. This process may be repeated for a plurality of symbols, and an analysis of the results may be used to generate a final offset value to be used to trigger hopping operations.

In this example, processor 1200 includes two comparators 1221 and 1222. Comparator 1221 includes an input coupled to receive a threshold value and a magnitude value. Comparator 1222 includes an input coupled to receive a magnitude value. The second input to comparator 1222 is coupled to the output of a digital multiplier 1225. The input of multiplier 1225 is coupled to the magnitude value for the previously received peak stored in memory 1224. Thus, if a subsequently received peak for a symbol is above a threshold and the magnitude of the subsequently received peak is greater in value than the previously stored peak multiplied by some factor, then both the outputs of comparators 1221 and 1222 will be '1', and correlation results for the subsequent peak will be stored in memory 1224—overwriting the correlation results for the previously stored peak. Comparators 1221 and. 1222 may implement digital subtraction as described above, for example, and generate a sign bit, which is received by an AND gate 1223 to active a write enable.

Thus, one example algorithm for analyzing correlation results of received symbols to generate an offset value is illustrated by FIGS. 12A and 12B. For example, if a symbol generates the cluster of results illustrated in FIG. 12B, the correlation results for peak A will be stored in memory 1224. The "timer value" of counter 1210 stored for this result is '0'. When counter 1210 is '1', the results are below the threshold and therefore ignored. When counter 1210 is '2', a second peak (peak B) above the threshold is detected. Peak A and peak B are compared. If peak B is larger than peak A by a factor (e.g., 1.25), then the results for peak B are stored in memory 1224, overwriting the peak A's results. In this case, the timer value stored in memory for peak B is '2'. Peaks C and D are similarly processed, but the results for these peaks are not stored because the peaks are not larger than peak B by a predetermined factor. However, the results for peak E are greater than peak B by a factor (e.g., 1.25). Thus, the results for peak E are stored in memory. The stored timer value for peak E is '10'.

As subsequent symbols are received, the memory address may be incremented to new locations. Accordingly, subsequent correlation results for a subsequent symbol may not overwrite the final result for a previous symbol. Thus, as each symbol is received, the cross correlation results are analyzed, and the results for one of the peaks are selected and stored as the representative peak for the cluster. In one embodiment, 15 symbols may be received to generate 15 clusters, which are analyzed to generate 15 representative peaks with corresponding correlation results and timer values. Some of the representative peaks may have different timer values, but some may have the same timer value. At the end of each cluster, the timer value may be used to increment memory locations in position memory bank 1227 to create a histogram of the results. The histogram represents the number of times a representative peak in each cluster (corresponding to different received symbols).occurred at a particular value of the time base counter 1210.

Control logic and reset controller 1250 is coupled to the pattern indicator lines 1250 for triggering down counter 1213 each time a representative peak in a cluster of peaks is written into memory 1224. For example, a first peak in a cluster may trigger controller 1250, and thereby also trigger down counter 1213. If a subsequent peak in the cluster is determined to be the representative peak, then down counter 1213 may be restarted at the time the selected peak is received. The delay from down counter 1213 to a hopping command will thus be from the representative peak in the cluster. Accordingly, control and reset controller 1250 includes an input coupled to pattern indicator lines 1201 and another input coupled to the output of AND gate 1223. As mentioned above, AND gate 1223 generates an output when a peak is selected for storage in memory 1224. Thus, if control and reset logic 1250 detects a peak on lines 1201 and the detected peak is selected for storage in memory 1224 as a representative peak of the cluster, then controller 1250 signals hopping control logic 1211 to restart down counter 1213.

Figure 13A:
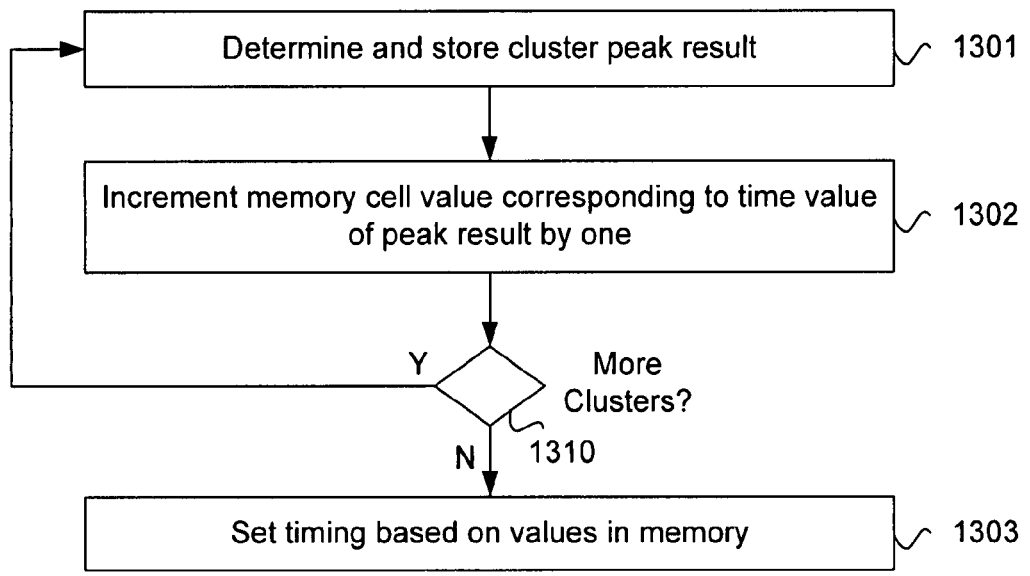
FIG. 13A illustrates an example method of processing correlation results according to one embodiment of the present invention.
Figure 13B:
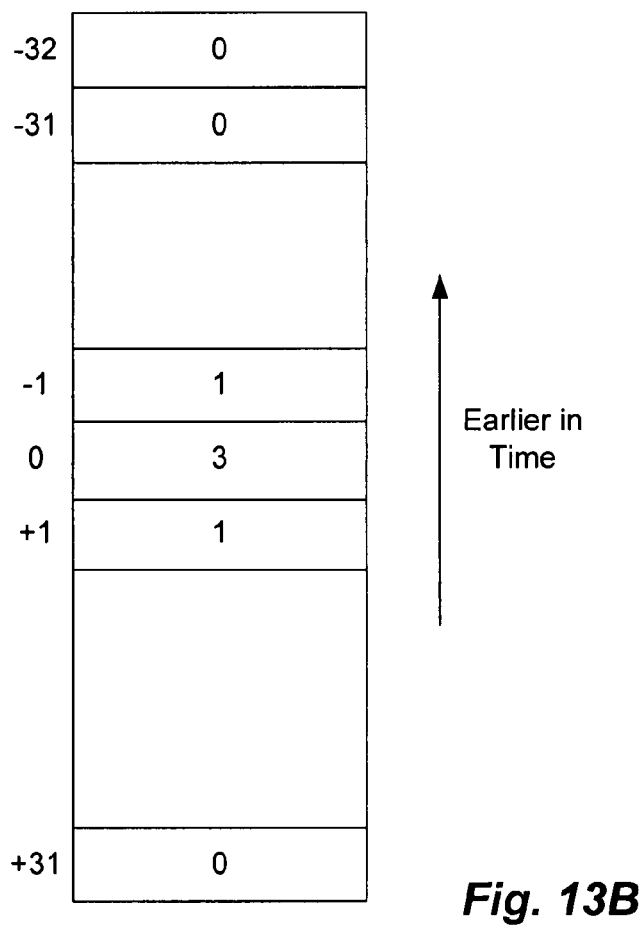
FIG. 13B illustrates an example histogram of timer values according to one embodiment of the present invention.

FIG. 13A illustrates an example method of processing correlation results according to one embodiment of the present invention. At 1301, cluster peak results are determined and stored. For example, correlation results may be compared to a threshold to determine if the results are peaks, and the received peaks may be compared to previous peaks to determine if they should be stored. The time value for the peak may also be stored. The time value may be the value of a time base counter at the time the peak was received. At 1302, a memory cell value corresponding to the time value of the peak result may be incremented by one. FIG. 13B illustrates an example histogram of timer values according to one embodiment of the present invention. This figure illustrates that a memory may be used to represent points in time. The memory location with address '−32' may represent a point in time earlier than the memory cell with address '+31', for example. The center address of the memory (address 0) may represent the point in time where the time base counter is zero. Thus, if three stored representative peaks in three different clusters had corresponding timer values of zero, then the value of memory location 0 may be may be incremented three times to a final value of 3. Similarly, stored representative peaks that occurred at times before the time base counter had a value of zero would have addresses in the range of −32 to −1, and stored representative peaks that occurred at times after the time base counter had a value of zero would have addresses in the range of +1 to +31, for example. Accordingly, the values in each memory cell in FIG. 13B represent the number of times a representative peak occurred at a particular value of the time base counter.

Referring again to FIG. 13A, if additional clusters to be analyzed are received, the process may store more cluster peak results and continue incrementing memory cell values to record the time value of the free running counter associated with each peak. When there are no further clusters to be analyzed at 1310, the timing of the system is set based on the values stored in the memory cells. A variety of algorithms could be used to determine an offset based on the values stored in memory. For example, an algorithm could use the counter value corresponding to earliest peak detected, the value with the most representative peaks, or other algorithms that consider the distribution of representative peaks over time represented in position memory 1227 or the particular correlation results stored in cluster memory 1224, or combinations of both.

Referring again to FIG. 12A, cluster memory 1224 is addressed by cluster memory address controller 1252, which stores a cluster index (or symbol index) so that results from clusters for different symbols are stored in different memory locations and do not over-write the previous results for a previous symbol's corresponding cluster. Cluster address controller 1252 is controlled by cluster window controller 1251.

Cluster window controller 1251 controls the time period during each cycle of timebase counter 1210 when incoming peaks are analyzed. Peaks at the cross-correlator output may be analyzed starting with the first received peak for each symbol, and continuing for a time period. The time period during which detected peaks are analyzed by processor 1200 may be referred to as the "cluster window." For example, when timebase counter 1210 reaches zero, or when a peak is received on indicator lines 1201, whichever occurs first, another count may be initiated by cluster window controller 1251 (e.g., for 20 cycles of the system clock—"20 samples") during which a plurality of incoming peaks (i.e., peak clusters) are analyzed. At the end of the time period, the final selected peak is stored in memory 1224 and used to increment one of the memory cells in position memory 1227. Additionally, cluster window controller 1251 may increment cluster address controller to the next memory location in memory 1224 for storing information about subsequent peak clusters generated by subsequently received symbols.

Address mapping logic 1226 includes an input coupled to receive the final timer values for each cluster in cluster memory 1224 and another input coupled to time base counter 1210. At the end of each cycle of counter 1210, information for one representative peak out of a cluster of detected peaks will be stored in cluster memory 1224. The timer value, which represents the value of time base counter 1210 at the moment the stored peak was detected, is used to select a memory location in position memory 1227 to increment. In this example, the stored timer value is used as an address input to address mapping logic 1226. Address mapping logic 1226 specifies the address in position memory 1227 to be incremented by incrementor 1229. Address mapping logic 1226 will use a new stored timer value once every counter period (e.g., 165 samples). Counter 1210 may configure address mapping logic 1226 every cycle, for example.

Block decision boundary 1228 may store an offset value representing the point in time when the system should hop between synchronizer frequencies. Block decision boundary 1228 may include logic responsive to cluster address controller 1252. When a cluster index value in address controller 1252 reaches a final address signaling that the last cluster to be analyzed has been received (e.g., 15 symbols and corresponding clusters have been received), the block boundary logic 1228 may implement an algorithm for determining which position in position memory 1227 is to be used as the final block boundary offset value. Hopping control logic 1211 may receive as inputs the stored offset value in block decision boundary 1228 and the changing values of time base counter 1210. After the block decision boundary offset value has been determined (e.g., based on the information in memory 1227 as described above), down counter 1213 may be initiated on each cycle of counter 1210 when the value of counter 1210 corresponds to the offset value stored in block decision boundary 1228. In one embodiment, block decision boundary 1228 stores a sequence of bits that will match a particular sequence of bits in counter 1210 representing the point in time in each cycle of counter 1210 when the system should start down counter 1213. Hopping control logic 1211 receives the changing values of timebase counter 1210 and the offset value from block decision boundary 1228, and performs a comparison of the two values. In this example, down counter 1213 will be started when the value of counter 1210 matches the offset value in block decision boundary 1228.

In the example shown in FIG. 12A, when the final cluster has been analyzed and the appropriate offset value has been stored in the block boundary 1228, the remaining hopping commands become systematically triggered when the free running timebase counter 1210 hits the value specified by block boundary 1228. For instance, cluster address controller 1252 includes an output coupled to hopping control logic 1211 for signaling the end of processing. When the cluster index in address controller 1252 increments to a particular value representing the last cluster to be analyzed, the cluster index may also be used by logic 1211 to start using the final offset value in block boundary 1228, rather than signals from controller 1250, for starting down counter 1213 for controlling system hopping.

Figure 14A:
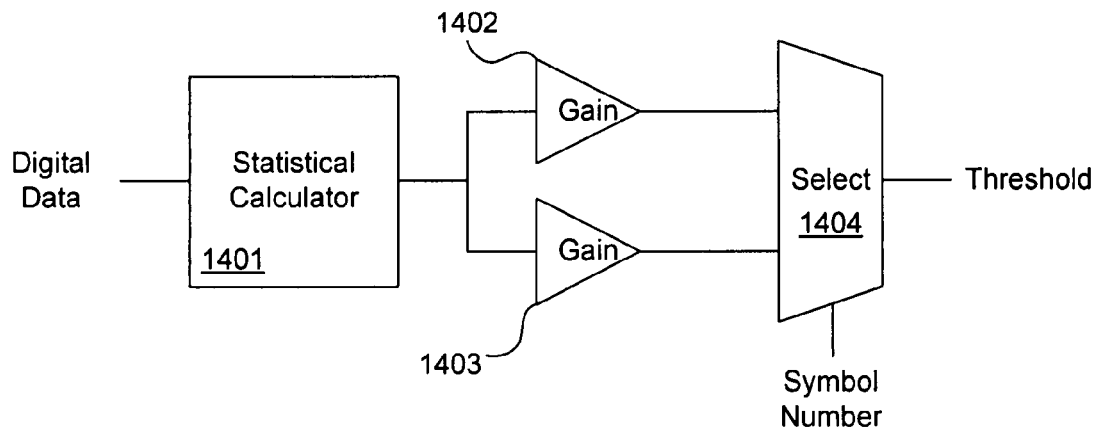
FIGS. 14A-B illustrate threshold generation according to one embodiment of the present invention.
Figure 14B:
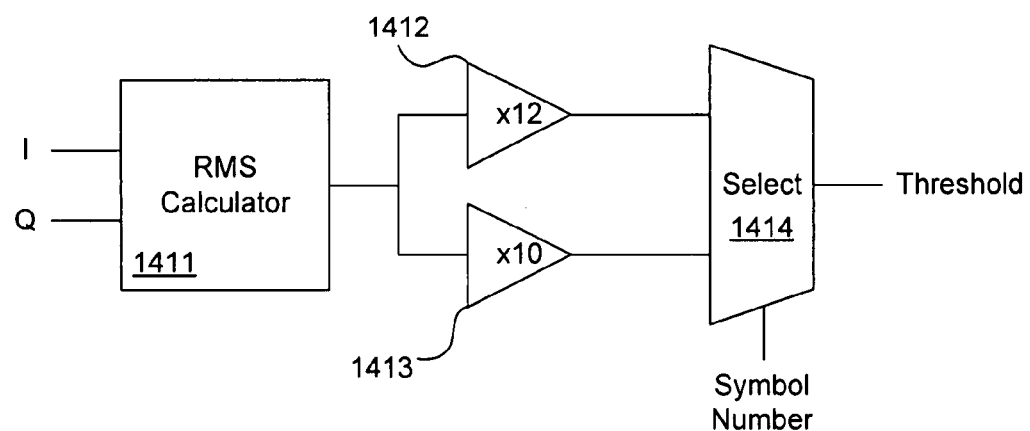

FIGS. 14A-B illustrates threshold generation according to one embodiment of the present invention. In one embodiment, thresholds may be generated based on the incoming symbols. For example, an analog signal containing symbols may be digitized in an analog-to-digital converter to generate a digital data stream. The digital data stream may represent each symbol as 165 samples at a frequency of 1.056 GHz, for example. Embodiments of the present invention may generate thresholds based on characteristics of the received digital data. For example, the system may determine characteristics of the received signal such as RMS to generate a threshold level. In one example embodiment, statistical calculations are performed on the received digital data to generate the threshold. As illustrated in FIG. 14, the system may include a statistical calculator 1401 for performing statistical analysis on incoming data. For example, the system may perform a root-mean-square operation on incoming data.

In one embodiment, the system may use different thresholds at different times. For example, the output of statistical calculator may be amplified by multipliers 1402 or 1403. The system may count the number of symbols received, may use a first gain 1402 for a first number of received symbols to generate a first threshold, and use a second gain for a second number of received symbols to generate a second threshold. The system may include a selection circuit 1404 (e.g., a multiplexer) that receives the two thresholds and selects one of the thresholds based on the number of symbols received. The number of symbols received may be stored as a digital index value, for example ("symbol number").

As illustrated in the example of FIG. 14B, I and Q digital data streams may be received at the input of an RMS calculator 1411. The output RMS result may be amplified by a gain of 12 ("×12") for the first nine (9) symbols for generating a first threshold value. The RMS result may be amplified by a gain of 10 ("×10") on receiving the tenth symbol and subsequent symbols for generating a second threshold value. Selection of threshold values may be made by selector 1414, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. The features and functions described above may be embodied in various forms, such as semiconductor circuits implemented using application specific integrated circuits or programmable logic, or as software such Verilog, VHDL, or other run time logic (RTL) encoding formats. Based on the above disclosure and the following claims, other arrangements, embodiments, implementations and equivalents will be evident to those skilled in the art and may be employed without departing from the spirit and scope of the invention as defined by the claims.

What is claimed is:

1. A wireless communication system comprising:
   an analog receiver for receiving a plurality of symbols on a plurality of frequency channels, each symbol lasting a first time period;
   a reference frequency generator for generating a periodic reference signal having a period equal to the first time period of each symbol: and
   a channel controller coupled to the reference frequency generator, the channel controller generating a command to the analog receiver to change from one frequency channel to another frequency channel a predetermined amount of time after the reference frequency signal enters a predetermined state.

2. The system of claim 1 further comprising a delay coupled to the reference frequency generator, wherein the delay triggers the channel controller to generate said command a predetermined amount of time after the reference frequency signal enters said predetermined state.

3. The system of claim 1 wherein the reference frequency generator is a counter, and wherein said command is generated a predetermined amount of time after said counter reaches a predetermined value.

4. The system of claim 1 further comprising a plurality of correlators, wherein each correlator receives a digital representation of said symbols and correlates each symbol with a plurality of reference values, and in accordance therewith, generates correlation results, and wherein the correlation results control the commands generated by the channel controller.

5. The system of claim 4 wherein the correlation results for each symbol are compared to a threshold.

6. The system of claim 4 wherein the correlation results for each symbol include a plurality of correlation results, and wherein at least one of said plurality of correlation results is stored and associated with a state of said reference frequency signal.

7. The system of claim 4 wherein the correlation results are compared against a first threshold for a first time period and the correlation results are compared against a second threshold for a second time period.

8. The system of claim 1 further comprising a memory for storing a time each symbol is detected.

9. The system of claim 1 further comprising a memory for storing a plurality of values indicating the number of times a corresponding plurality of symbols are detected at a particular time.

10. A method of receiving information in a wireless communication system comprising:
    receiving a plurality of symbols on a plurality of frequency channels, each symbol lasting a first time period;
    generating a reference frequency having a period equal to the first time period of the symbol; and
    generating a channel control signal to change from a first channel to a second channel at a predetermined point in time of the reference frequency period.

11. The method of claim 10 further comprising:
    detecting a first symbol in said plurality of symbols; and
    starting the reference frequency in response to detecting the first symbol.

12. The method of claim 10 wherein generating the reference frequency comprises operating a counter that cycles through a plurality of values during each reference frequency period, and wherein the predetermined point in time of the reference frequency period corresponds to one of said plurality of values.

13. The method of claim 10 further comprising storing a delay value.

14. The method of claim 10 further comprising:
    detecting said predetermined point in time of the reference frequency period; and
    generating said channel control signals a predetermined amount of time after said detection.

15. A baseband processor comprising:
    a symbol processor that detects symbols received by said baseband processor;
    a reference frequency generator that generates a periodic reference signal having a period equal to a symbol period;
    control logic coupled to the reference frequency generator, wherein the control logic receives the reference frequency signal, and generates an output when the reference frequency signal is in a predetermined state; and
    a channel controller coupled to the output of the control logic, the channel controller generating frequency synthesizer control signals in response to the control logic output signal a predetermined amount of time after receiving said output from said control logic.

16. The baseband processor of claim 15 wherein the reference frequency generator is a counter and the predetermined state is a predetermine value of said counter.

17. The baseband processor of claim 15 wherein the reference frequency generator is a first counter and the control logic includes a second counter for generating said control logic output signal after counting for said predetermined amount of time.

18. The baseband processor of claim 15 wherein said symbol processor includes a plurality of cross-correlators, and wherein the channel controller generates first frequency control signals corresponding to a first frequency pattern if a first of said plurality of cross-correlators indicates that a symbol has been received, and the channel controller generates second frequency control signals corresponding to a second frequency pattern if a second of said plurality of cross-correlators indicates that a symbol has been received.

19. The baseband processor of claim 15 wherein the reference frequency generator is a counter, and wherein said symbol processor includes a plurality of cross-correlators that generate a plurality of correlation results for each symbol, and wherein each correlation result corresponds in time to a plurality of values of said counter, and wherein a representative value of said counter is stored for each of a plurality of received symbols and used to produce a final value for generating said control logic output.

20. A method of receiving information in a wireless communication system comprising:

receiving a digital signal at a first data rate;
filtering the digital signal;
decimating the digital signal to a second data rate;
correlating the digital signal with a plurality of reference values; and
programming a synthesizer with one of a plurality of frequency patterns corresponding to the reference value resulting in the largest correlation result.

21. The method of claim 20 further comprising comparing the correlation results against a first threshold during a first time period and comparing the correlation results against a second threshold during a second time period.

22. The method of claim 20 further comprising comparing the correlation results against a first threshold, and in accordance therewith, detecting an increase in a first correlation result, and generating a hopping command a predetermined amount of time after detecting said increase in said correlation result.

23. The method of claim 20 wherein the digital signal includes a plurality of symbols having a first period, the method further comprising operating a counter having a period equal to the first period.

* * * * *